United States Patent
Parashurama et al.

(10) Patent No.: US 11,789,518 B2
(45) Date of Patent: Oct. 17, 2023

(54) VOLTAGE OVERSHOOT MANAGEMENT

(71) Applicant: International Business Machines Corporation, Armonk, NY (US)

(72) Inventors: Pradeep Bhadravati Parashurama, Bhadravati (IN); Alper Buyuktosunoglu, White Plains, NY (US); Ramon Bertran Monfort, New York, NY (US); Tobias Webel, Schwaebisch-Gmuend (DE); Srinivas Bangalore Purushotham, Bangalore (IN); Preetham M. Lobo, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/355,148

(22) Filed: Jun. 22, 2021

(65) Prior Publication Data
US 2022/0404890 A1  Dec. 22, 2022

(51) Int. Cl.
G06F 1/00 (2006.01)
G06F 1/3234 (2019.01)
G06F 1/3296 (2019.01)
G06F 1/324 (2019.01)

(52) U.S. Cl.
CPC .......... G06F 1/3243 (2013.01); G06F 1/324 (2013.01); G06F 1/3296 (2013.01)

(58) Field of Classification Search
CPC ....... G06F 1/3243; G06F 1/324; G06F 1/3296
See application file for complete search history.

(56) References Cited

U.S. PATENT DOCUMENTS

| | | | | |
|---|---|---|---|---|
| 6,101,578 A | * | 8/2000 | Patwardhan | G11C 29/16 711/144 |
| 6,943,535 B1 | * | 9/2005 | Schiff | H02M 3/1584 323/244 |
| 9,973,083 B1 | * | 5/2018 | Rose | H02M 3/156 |
| 10,879,800 B2 | * | 12/2020 | Choi | H02P 9/307 |
| 2012/0066536 A1 | * | 3/2012 | Gozun | H02J 1/14 713/340 |

(Continued)

OTHER PUBLICATIONS

Chuang et al., "Power Supply Noise in a 22nm z13TM Microprocessor," 2017 IEEE International Solid-State Circuits Conference, Feb. 8, 2017, 2 pages.

(Continued)

*Primary Examiner* — Mohammed H Rehman
(74) *Attorney, Agent, or Firm* — Richard B. Thomas

(57) ABSTRACT

Embodiments relate to a system, program product, and method for mitigating voltage overshoot in one or more cores in a multicore processing device including a plurality of cores. The method includes determining, in real-time, an indication of power consumption within each core of the one or more cores. The method also includes determining, through the indication of power consumption, a voltage overshoot condition in the one or more cores. The method further includes increasing, for the one or more cores, a power demand thereof. The method also includes increasing, subject to the increasing the power demand, power delivery to the one or more cores, thereby at least arresting the rate of increase of the voltage overshoot.

20 Claims, 11 Drawing Sheets

(56) References Cited

U.S. PATENT DOCUMENTS

| | | | |
|---|---|---|---|
| 2012/0195087 A1* | 8/2012 | Kroeze | H02M 7/487 363/134 |
| 2015/0214963 A1* | 7/2015 | Liu | H03L 7/1972 327/156 |
| 2016/0357245 A1* | 12/2016 | Heo | G06F 1/26 |
| 2016/0363918 A1 | 12/2016 | Einfalt | |
| 2017/0038814 A1 | 2/2017 | Pal | |
| 2018/0375438 A1* | 12/2018 | Shekhar | G05F 1/46 |
| 2019/0074771 A1* | 3/2019 | Zeng | H02M 1/08 |
| 2019/0265779 A1* | 8/2019 | Gelman | G06F 1/08 |
| 2020/0007039 A1 | 1/2020 | Jain | |
| 2020/0272220 A1* | 8/2020 | Mosalikanti | H03L 7/093 |
| 2020/0326372 A1* | 10/2020 | Rottner | G01R 31/2834 |
| 2021/0034421 A1* | 2/2021 | Gu | G06F 1/3206 |
| 2021/0124404 A1* | 4/2021 | Mohammad | G06F 1/3296 |
| 2022/0091649 A1* | 3/2022 | Knoth | G06F 1/3228 |
| 2022/0236754 A1* | 7/2022 | Dinh | G06F 1/3243 |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pages.

* cited by examiner

VOLTAGE OVERSHOOT MANAGEMENT

BACKGROUND

The present disclosure relates to voltage overshoot mitigation in one or more processor cores, and, more specifically, to increasing power demand to one or more cores in a multicore processing device to mitigate voltage overshoot.

Many known modern processing devices include multiple cores that are powered through a steady-state power source. As the processing activity on the cores varies, the power requirements of the cores will vary in direct proportion to the present processing activity. A rapid change of the processing activity from a relatively high level, with the respective high power draw, to a relatively low level, also with the respective low power draw, has the potential to induce a significant voltage overshoot at the cores.

SUMMARY

A system, computer program product, and method are provided for increasing power demand to one or more cores in a multicore processing device to mitigate voltage overshoot in the cores.

In one aspect, a computer system is provided for increasing power demand to one or more cores in a multicore processing device to mitigate voltage overshoot. The system includes one or more memory devices communicatively and operably coupled to the multicore processing device. The system also includes a voltage overshoot management system at least partially embedded within the one or more memory devices. The voltage overshoot management system includes one or more voltage overshoot activation circuits. The voltage overshoot management system is configured to determine, in real-time, an indication of power consumption within each core of the one or more cores. The voltage overshoot management system is also configured to determine, through the indication of power consumption, a voltage overshoot condition in the one or more cores. The voltage overshoot management system is further configured to increase, for the one or more cores, through the one or more voltage overshoot activation circuits, a power demand thereof. The voltage overshoot management system is also configured to increase, subject to the increasing the power demand, through the one or more voltage overshoot activation circuits, power delivery to the one or more cores, thereby at least arresting the rate of increase of the voltage overshoot.

In another aspect, a computer program product embodied on at least one computer readable storage medium has computer executable instructions for mitigating voltage overshoot in one or more cores in a multicore processing device that when executed cause one or more computing devices to determine, in real-time, an indication of power consumption within each core of the one or more cores; determine, through the indication of power consumption, a voltage overshoot condition in the one or more cores; increase, for the one or more cores, through the one or more voltage overshoot activation circuits, a power demand thereof; and increase, subject to the increasing the power demand, through the one or more voltage overshoot activation circuits, power delivery to the one or more cores, thereby at least arresting the rate of increase of the voltage overshoot.

In yet another aspect, a computer-implemented method is provided for mitigating voltage overshoot in one or more cores in a multicore processing device including a plurality of cores. The method includes determining, in real-time, an indication of power consumption within each core of the one or more cores. The method also includes determining, through the indication of power consumption, a voltage overshoot condition in the one or more cores. The method further includes increasing, for the one or more cores, a power demand thereof. The method also includes increasing, for the one or more cores, a power demand thereof. The method further includes increasing, subject to the increasing the power demand, power delivery to the one or more cores, thereby at least arresting the rate of increase of the voltage overshoot.

The present Summary is not intended to illustrate each aspect of, every implementation of, and/or every embodiment of the present disclosure. These and other features and advantages will become apparent from the following detailed description of the present embodiment(s), taken in conjunction with the accompanying drawings.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are illustrative of certain embodiments and do not limit the disclosure.

Figure 1:
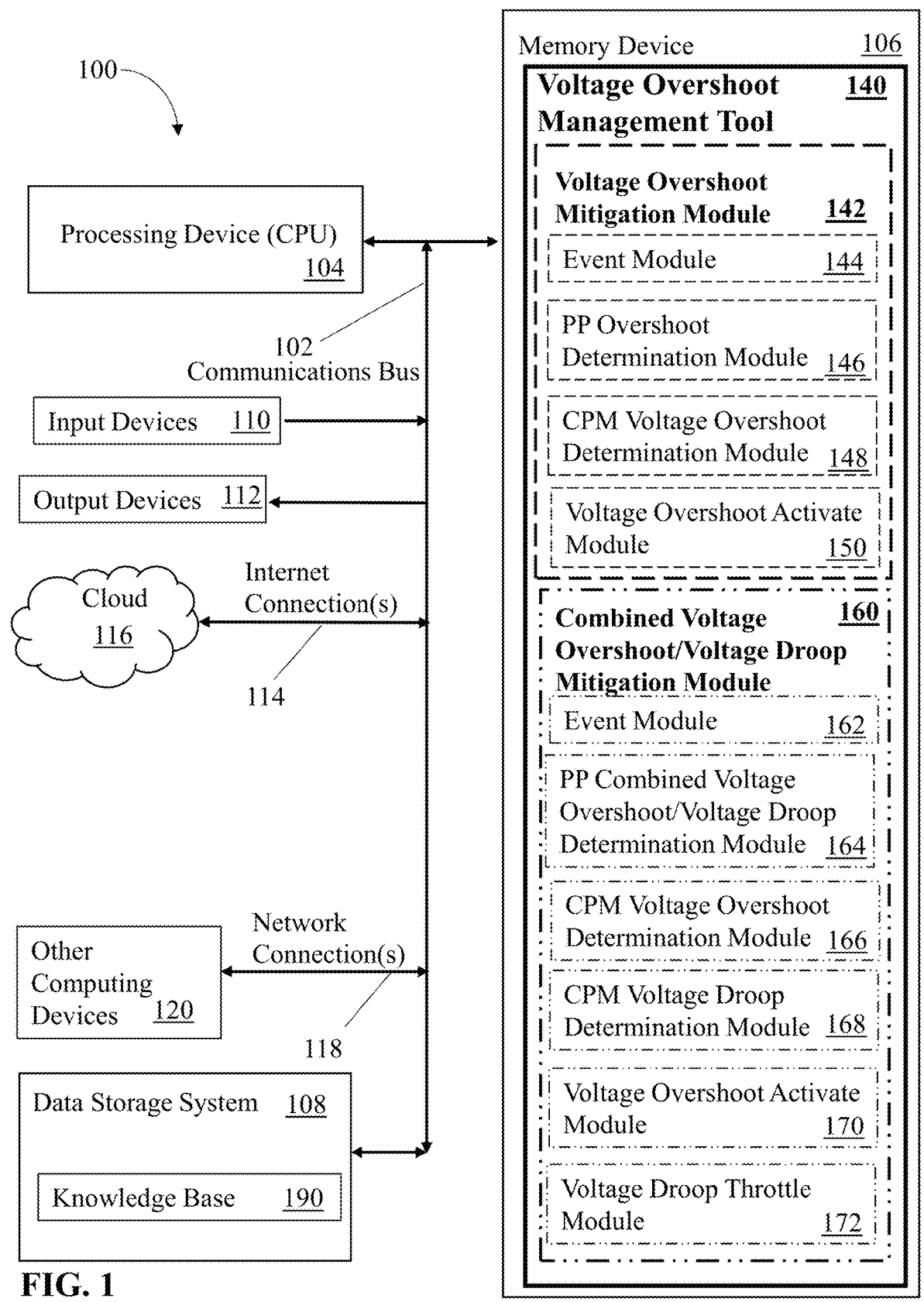
FIG. 1 is a block schematic diagram illustrating a computer system configured for increasing power demand to one or more cores in a multicore processing device to mitigate voltage overshoot, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate to increasing power demand to one or more cores in a multicore processing device to mitigate voltage overshoot. While the present disclosure is not necessarily limited to such applications, various aspects of the disclosure may be appreciated through a discussion of various examples using this context.

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "at least one embodiment," "one embodiment," "another embodiment," "other embodiments," or "an embodiment" and similar language means that a particular feature, structure, or characteristic described in connection with the embodiment is included in at least one embodiment. Thus, appearances of the phrases "a select embodiment," "at least one embodiment," "in one embodiment," "another embodiment," "other embodiments," or "an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Many known modern processing devices, sometimes referred to as central processing units, or CPUs, are positioned on a single chip (or die, where the terms are used interchangeably herein) as an integrated circuit. Many of these known CPUs are multicore processors, i.e., a computer processor on a single integrated circuit with two or more separate processing units, called cores, each of which reads and executes program instructions. These multiple cores may be powered through a steady-state power source. As the processing activity on the cores vary, the power requirements of the cores will vary in direct proportion to the present processing activity. As the processing loads on the cores vary, a sudden change in the core activity of a computer processor can result in either a relatively large increase or decrease in the power demand, i.e., power drawn from the power source due to inductive noise therein. Specifically, a rapid change of the processing activity from a relatively high level, with the respective high power draw, to a relatively low level, with the respective low power draw, has the potential to induce a significant voltage excursion, i.e., overshoot at the cores. Moreover, for multicore processing devices, if multiple cores in a single processor-chip were to change from high activity to low activity in a small interval of time, the voltage overshoot observed at all cores can be quite large. Voltage overshoot conditions can affect the long term chip reliability issues due to the higher voltage. Therefore, the power management features of the multicore processing device will attempt to compensate for the voltage surge transient through mechanisms that include employment of voltage regulation features to alleviate the voltage overshoot conditions.

In addition to voltage overshoot conditions, for those instances where most or all of the cores rapidly change from high activity to low activity for approximately 100 nanoseconds (ns), followed by a return from low activity to high activity, the voltage overshoot conditions exacerbate a subsequent voltage droop condition on the affected cores. Voltage droop refers to the reduction in available current in a circuit to process the present loading on one or more of the processing cores that is manifested as a reduction in the supply voltage to the cores. If the multiple cores in a multicore processor change from relatively low activity to relatively high activity in a relatively small interval of time, the voltage droop observed at all processor cores may be relatively significant. In some situations, the voltage droop may be significant enough to exceed an established threshold and thereby induce a microarchitectural stall event. Such a stall event is sometimes referred to as a pipeline stall, where the execution of instructions is delayed and, in some instances, the chip might shift into a non-functional state, i.e., potentially lead to a core shut-down event. At least one known type of stall events includes large stall events that have features that include, without limitation, one or more operations that include extended latencies. The aforementioned remedial efforts to regulate the voltage to minimize the voltage surge peak and temporal length of the transient through using voltage regulation features to decrease the magnitude of the voltage will exacerbate the effects of a subsequent increase in processing activity and the resultant voltage droop. For those instances where the rapid activity steps of most or all of the cores are aligned within approximately 20 ns of each other, however, not in perfect alignment, a superposition of the respective voltage waveforms for the cores after the voltage overshoot conditions may increase the voltage droop across the cores by approximately 20% with an approximately 90% increase in the slope of the voltage droop relative to what would have been experienced without the voltage overshoot.

Many of the known multicore processors include one or more critical-path monitor (CPM) sensors placed at various locations in each processor core to act as monitors of voltage overshoot for the respective processor core. However, from the time at which the processor activity decreases until the point in time when the CPM sensors respond to the voltage overshoot event, there can be a certain amount of latency, i.e., delay, e.g., 40 to 50 processor clock-cycles. If the magnitude by which the processing activity decreases is relatively significant and the duration of the change in processing activity is relatively short, thereby defining a relatively steep rate of decreasing power draw, the processors may not be able to activate remedial action in time to prevent a significant voltage overshoot event resulting in a potential degradation of the material integrity of the and expected lifetime of the affected cores. Moreover, as previously described, if a significant power draw immediately follows the rapid decrease, a significant voltage droop condition may develop resulting in a processor stall. Therefore, reliance on voltage sensing alone may not successfully mitigate such voltage overshoot events.

A system, computer program product, and method are disclosed and described herein for initiating remedial actions for a sensed voltage overshoot to arrest the overshoot, thereby mitigating the magnitude of a subsequent voltage droop event. Such voltage droop mitigation is facilitated through increasing power demand to one or more of the processor cores in the multicore processing device to mitigate the initial voltage overshoot conditions. The mechanism to arrest the overshoot includes artificially increasing the power demand at the affected cores, and all cores if necessary, with the increased demand flattening the voltage surge to reduce the magnitude of the surge and its duration. The mechanism to artificially increase the power demand for the cores is configured to not further exacerbate the subsequent voltage droop when the processing demand for the cores rebounds rapidly.

In at least some of the embodiments, real-time power proxy estimates are generated through determining if a core is executing instructions or not and apply a weighting factor value to the present instructions being executed over a predetermined period of time, for example, and without limitation, 8 cycles. The weighting values are obtained through empirical characterization obtained by running numerous workloads through the respective processor cores, and collecting the power consumption data for the particular instructions being executed. Through mathematical formula, the weighting factors are estimated and the calculated estimations are compared with the actual values of the power consumed for the respective workloads. Therefore, accurate estimations of real-time power draw data are generated based on collected real-time processor activity.

In at least some of the embodiments described herein, real-time voltage change measurements through critical-path monitor (CPM) sensors are combined to detect voltage overshoot conditions at each core. Many of the known multicore processors include one or more CPM sensors placed at various locations in each processor core to act as monitors of real-time voltage overshoot and real-time voltage droop for the respective processor core.

The CPM sensors present in the processing core may also provide chip-wide voltage measurements, since all of the processing cores are on a common clock-grid. Therefore, the embodiments disclosed herein include using a voltage slope as derived from the CPM voltage measurements as an anchor (to know the state of the chip) locally at the respective cores and use of the power proxy measurements (also for the respective cores) to detect a change in the affected core's processing activity to detect the voltage overshoot at the incipient stage. Once the voltage overshoot is detected, the power demand from the affected cores, or all the cores, is artificially increased through one or more methods, including, without limitation, disabling clock gating for the affected cores. Clock gating is a popular technique used in many synchronous circuits, i.e., processing cores for reducing unnecessary dynamic power dissipation, by removing the clock signal when the processing core is not in use. Clock gating reduces power consumption through disabling portions of the circuitry so that devices therein, such as flip-flops, do not have to switch states, such switching consuming power. When not being switched, the switching power consumption goes to zero, and only leakage currents are incurred. Therefore, disabling the clock gating will increase the power demand for the respective processor core.

In some embodiments, it is estimated that a rapid transition from a high power condition to a low power condition will require at least a 25% increase in the rated power of the affected processor core to arrest the resulting rate of increasing voltage associated with the voltage overshoot. In at least some embodiments, the disabling of the processing core array clock gating accounts for approximately 15% increase, thereby requiring an additional 10% artificial power demand increase. In some embodiments, dummy fetches into the core-adjacent L3 cache arrays from the respective core will provide at least a portion of the remaining power demand. Dummy fetches include, without limitation, using predetermined instructions to cause data to be retrieved for a predetermined address, or addresses, where execution of the retrieved data is suppressed. Therefore, invoking dummy fetches increases the power demand on the core without necessarily inducing significant increases of the processing activity on the core. In some embodiments, clock gating for the adjacent L3 cache array may be disabled to provide at least a portion of the remaining power demand. In addition, in at least some embodiments, the time period to execute the aforementioned artificially-created power demands for the processor cores to arrest the induced voltage overshoot events is approximately 5 ns, i.e., approximately 25 cycles at approximately 5 gigahertz (GHz).

In embodiments, the early arresting of the voltage overshoot facilitates decreasing the magnitude of the subsequent voltage droop since the increased artificial power draws may be quickly terminated to not provide significant power demand as the rapid rise in processing activity increases.

Moreover, the system, computer program product, and method disclosed and described herein are configured to identify and arrest voltage droop conditions that may develop if the rapid drop in processing activity is quickly reversed within a particular time frame such that a rapid increase in processing activity initiates a droop in the processor voltage. Predetermined throttling actions are employed to arrest the resultant voltage droop conditions.

Referring to FIG. 1, a block schematic diagram is provided illustrating a computer system, i.e., voltage overshoot management system 100 (herein referred to as "the system 100") that is configured for voltage overshoot mitigation in one or more processor cores, in accordance with some embodiments of the present disclosure. More specifically, the system 100 is configured for initiating actions to increase the power demand for the cores in a multicore processing device. The increase in the current delivery to the affected cores arrests the increasing voltage associated with the overshoot to mitigate the magnitude and duration of the voltage overshoot, thereby mitigating the subsequent voltage droop that will develop if certain conditions at the affected cores present themselves.

The system 100 includes one or more processing devices 104 (only one shown) communicatively and operably coupled to one or more memory devices 106 (only one shown). The processing device 104 is a multicore processing device. The system 100 also includes a data storage system 108 that is communicatively coupled to the processing device 104 and memory device 106 through a communications bus 102. The system 100 further includes one or more input devices 110 and one or more output devices 112 communicatively coupled to the communications bus 102. In addition, the system 100 includes one or more Internet connections 114 (only one shown) that are communicatively coupled to the processing device 104 and memory device 106 through the communications bus 102, and communicatively coupled to the cloud 116. The system 100 further includes one or more network connections 118 (only one shown) communicatively coupled to the processing device 104 and memory device 106 through the communication bus 102, and communicatively coupled to one or more other computing devices 120. In some embodiments, the Internet connections 114 facilitate communication between the system 100 and one or more cloud-based centralized systems and/or services (not shown in FIG. 1).

In at least some embodiments, the system 100 is a portion of a cloud computing environment (see FIG. 7), e.g., and without limitation, system 100 is a computer system/server that may be used as a portion of a cloud-based systems and communications environment through the cloud 116 and the Internet connections 114. In one or more embodiments, a voltage overshoot management tool 140, herein referred to as "the tool 140", is resident within the memory device 106 to facilitate voltage overshoot mitigation in one or more processor cores. The tool 140 communicates with the multicore processing device 104 through the communications bus 102.

In one or more embodiments, the tool 140 includes a voltage overshoot mitigation module 142. In some embodiments, an alternative embodiment of the tool 140 includes a combined voltage overshoot/voltage droop mitigation module 160. Each of the voltage overshoot mitigation module 142 and the combined voltage overshoot/voltage droop mitigation module 160 are discussed in turn.

Referring to the voltage overshoot mitigation module 142 embodiments, the voltage overshoot mitigation module 142 is configured to collect power proxy power draw estimates of each of the cores and real-time voltage measurements, also from each of the cores. The voltage overshoot mitigation module 142 is also configured to process the collected data to determine if an overshoot event is in the incipient stage at the respective core, including one core or all the cores. The voltage overshoot mitigation module 142 is further configured to determine, in real-time, if the indications of the voltage overshoot excursion exceed a predetermined threshold, a trigger signal is transmitted from the voltage overshoot mitigation module 142 to voltage overshoot activation mechanisms to employ activation circuits (both discussed further with respect to FIG. 2) to arrest the voltage overshoot excursion. The voltage overshoot mitigation module 142 includes an event module 144 is configured to determine, in real-time, the indications of one or more processing events within one or more cores of the multicore processing device 104. The event module 144 is further configured to facilitate determining if the indicated events are associated with an imminent voltage overshoot event at least partially based on real-time data that indicates an incipient rapid decrease in processing activity on the respective cores. Accordingly, the event module 144 facilitates early detection of potential voltage overshoot events.

The voltage overshoot mitigation module 142 also includes a power proxy (PP) voltage overshoot determination module 146 that is configured to determine if certain predefined prerequisites for a voltage overshoot are present. The PP voltage overshoot determination module 146 is also configured to receive power proxy data for the respective cores through mechanisms discussed further with respect to FIG. 3. The PP voltage overshoot determination module 146 is further configured to generate estimates of the real-time power consumption by the respective core. The voltage overshoot mitigation module 142 further includes a CPM voltage overshoot determination module 148 that is also configured to determine if certain predefined prerequisites for a voltage overshoot are present. The CPM voltage overshoot determination module 148 is configured to receive real-time voltage data for the respective cores through the respective power proxy modules (discussed further with respect to FIG. 2).

In at least some embodiments, the voltage overshoot mitigation module 142 includes a voltage overshoot activate module 150 that is configured to facilitate determining one or more activation actions for the affected cores, including, the full set of cores, for the multicore processing device 104 based on the results of the operations executed by the PP voltage overshoot determination module 146 and the CPM voltage overshoot determination module 148. The voltage overshoot activate module 150 is also configured to transmit the determined one or more activate actions to one or more voltage overshoot activation circuits (discussed further with respect to FIG. 2).

In those embodiments including the combined voltage overshoot/voltage droop mitigation module 160 rather than the voltage overshoot mitigation module 142, the combined voltage overshoot/voltage droop mitigation module 160 is configured to collect power proxy power draw estimates of each of the cores and real-time voltage measurements, also from each of the cores. The combined voltage overshoot/voltage droop mitigation module 160 is also configured to process the collected data to determine if an overshoot event is in the incipient stage at the respective core, including one core or all the cores. The combined voltage overshoot/voltage droop mitigation module 160 is further configured to determine, in real-time, if the indications of the voltage overshoot excursion exceed a predetermined threshold, and if so, a trigger signal is transmitted from the combined voltage overshoot/voltage droop mitigation module 160 to voltage overshoot activation mechanisms to employ activation circuits to arrest the voltage overshoot excursion.

Further, in those embodiments including the combined voltage overshoot/voltage droop mitigation module 160, the combined voltage overshoot/voltage droop mitigation module 160 is configured to process the collected power proxy and voltage data to determine if a voltage droop event is in the incipient stage at the respective core, including one core or all the cores. The combined voltage overshoot/voltage droop mitigation module 160 is further configured to determine, in real-time, if the indications of the voltage droop exceed a predetermined threshold, and if so, a trigger signal is transmitted from the combined voltage overshoot/voltage droop mitigation module 160 to voltage throttling activation mechanisms to employ throttling circuits (discussed further with respect to FIG. 2) to arrest the voltage droop.

The combined voltage overshoot/voltage droop mitigation module 160 includes an event module 162, a power proxy (PP) combined voltage overshoot/voltage droop determination module 164, a CPM voltage overshoot determination module 166, and a voltage overshoot activate module 170 that are substantially similar to the event module 144, PP voltage overshoot determination module 146, the CPM voltage overshoot termination module 148, and the voltage overshoot activate module 150, respectively, of the voltage overshoot mitigation module 142.

The combined voltage overshoot/voltage droop mitigation module 160 also includes a CPM voltage droop determination module 168 that is configured to determine if certain predefined prerequisites for a voltage droop are present. The CPM voltage droop determination module 168 is configured to receive real-time voltage data for the respective cores through the respective power proxy modules (discussed further in FIG. 2). The combined voltage overshoot/voltage droop mitigation module 160 further includes a voltage droop throttle module 172 that is configured to facilitate determining a throttle action for the affected cores, including, the full set of cores, for the multicore processing device 104 based on the results of the operations executed by the PP combined voltage overshoot/voltage droop determination module 164 and the CPM voltage droop determination module 168. The voltage droop throttle module 172 is also configured to transmit the determined one or more throttle actions to one or more voltage droop throttle circuits (discussed further with respect to FIG. 2).

In at least some embodiments, the data storage system 108 provides storage to, and without limitation, a knowledge base 190 that includes the data associated with the weighting factors applied to the each of the cores to estimate the real-time power consumption, sometimes referred to as power consumption herein. In addition, the knowledge base 190 also maintains data associated with known voltage overshoot and voltage droop events, including, without limitation, indications of the events in progress at the incipient stages or later, and in some embodiments, the respective resolutions for each of the known events. The knowledge base 190 also maintains the data associated with the certain predefined prerequisites for voltage overshoot and voltage droop events, and, in some embodiments, the data associated with historical voltage overshoot and voltage droop events including, without limitation, magnitudes of the respective voltage overshoots, droops, and the respective durations. The knowledge base 190 further maintains the data associated with the associated predetermined threshold values thereof and the associated predetermined number of cycles. Moreover, the knowledge base 190 maintains the data associated with the historical power consumption values and the historical voltage measurement values for each of the cores of the multicore processing device 104. In addition, the knowledge base 190 maintains the data associated with historical combinations of the historical estimated power consumption values and the historical voltage measurement values and any resultant conditions for each of the cores of the multicore processing device 104.

Figure 2:
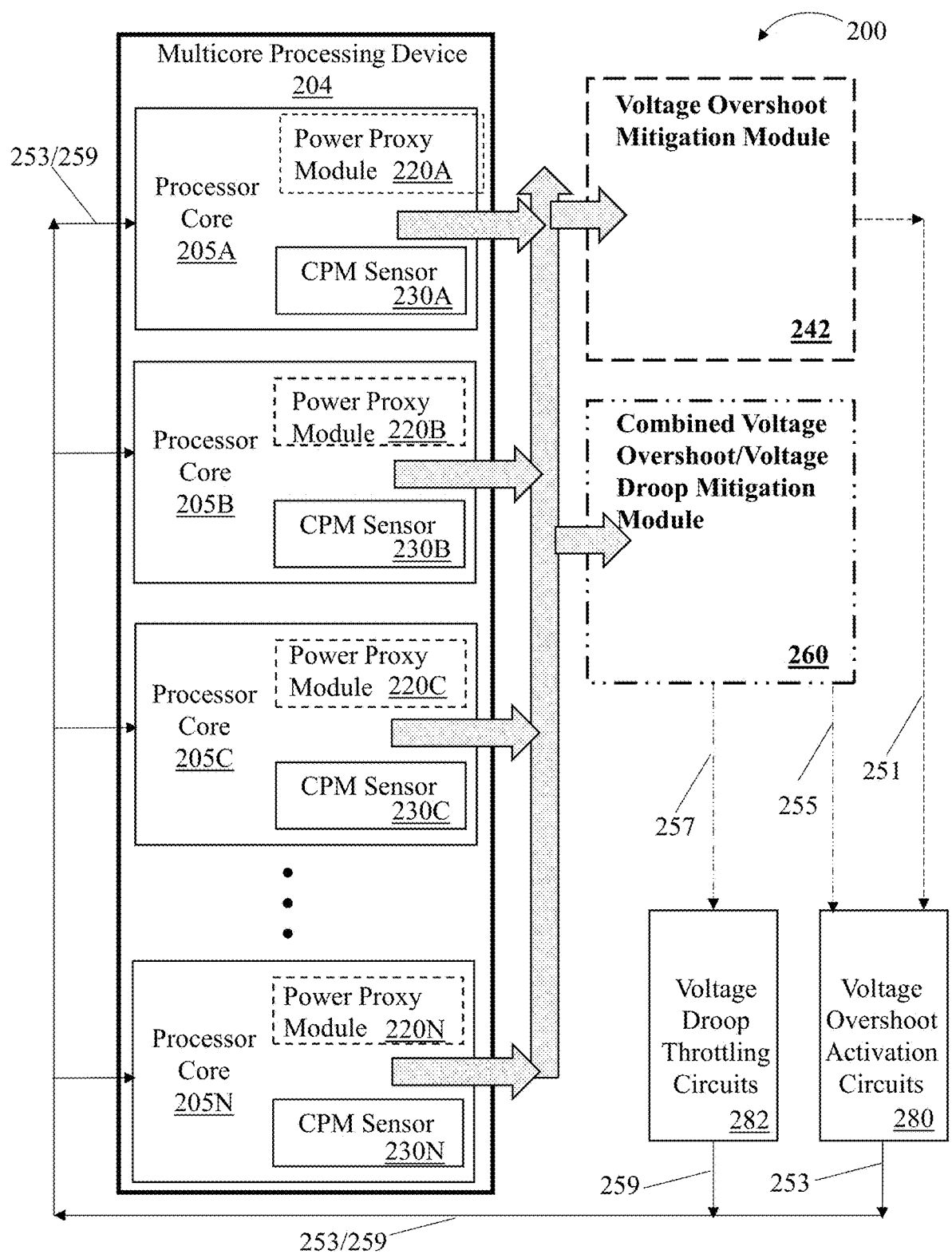
FIG. 2 is a block schematic diagram illustrating the relationships between a multicore processing device, a voltage overshoot mitigation module, a combined voltage overshoot/voltage droop mitigation module, one or more voltage overshoot activation circuits, and one or more voltage droop throttling circuits, in accordance with some embodiments of the present disclosure.

Referring to FIG. 2, a block schematic diagram is presented illustrating the relationships 200 between a multicore processing device 204, a voltage overshoot mitigation module 242, a combined voltage overshoot/voltage droop mitigation module 260, one or more voltage overshoot activation circuits 280, and one or more voltage droop throttling circuits 282, in accordance with some embodiments of the present disclosure. The multicore processing device 204 is substantially similar to the multicore processing device 104 (shown in FIG. 1) and includes a plurality of processor cores 205A, 205B, 205C, through 205N (herein collectively referred to as "processor cores 205"). In some embodiments, each of the processor cores 205 includes one or more respective power proxy modules 220A, 220B, 220C, . . . 220N (herein collectively referred to as "power proxy modules 220") (only one shown for each processor core 205 in FIG. 2). However, not all embodiments include the power proxy modules 220 since a separate mechanism is used in some embodiments to determine power proxy estimates as discussed further with respect to FIG. 3. Therefore, the power proxy modules 220 are shown in phantom. For those embodiments with the power proxy modules 220, whether used for voltage overshoot mitigation or not, each respective power proxy module 220 is configured to estimate the amount of power consumed by the respective processor core 205. As processing activity increases in the processor core 205, the amount of power consumed will increase, and the estimates of the power proxy modules 220 will indicate a change in the amount of processing activity by the respective cores 205.

Each of the processor cores 205 also includes one or more respective critical path monitor (CPM) sensors 230A, 230B, 230C, . . . 230N (herein collectively referred to as "CPM sensors 230") (only one shown for each processor core 205 in FIG. 2). The CPM sensors 230 are placed at various locations in each processor core 205 to act as monitors of voltage overshoot and voltage droop for the respective processor core 205. The CPM sensors 230 capture real-time voltage information for the respective processor cores 205. In some embodiments, a change in voltage of a processor core 205 will indicate a change in the processor core's 205 processing activity. In addition, the CPM sensors 230 generate time-stamped data that can be used to determine rate and direction of the voltage changes.

In some embodiments, the processor cores 205 are communicatively and operably coupled to the voltage overshoot mitigation module 242 that is substantially similar to the voltage overshoot mitigation module 142 (shown in FIG. 1). Also, in some embodiments, the voltage overshoot mitigation module 242 is configured to calculate real-time power proxy estimates through determining if a core is executing instructions or not and apply a weighting factor value to the present instructions being executed over a predetermined period of time, for example, and without limitation, 8 cycles. The weighting values are obtained through empirical characterization obtained by running numerous workloads through the respective processor cores, and collecting the power consumption data for the particular instructions being executed. Through mathematical formula, the weighting factors are estimated and the calculated estimations are compared with the actual values of the power consumed for the respective workloads. Therefore, accurate estimations of real-time power draw data are generated based on collected real-time processor activity.

For those embodiments with the power proxy modules 220, and where such embodiments employ the indications therefrom, the voltage overshoot mitigation module 242 is configured to collect power proxy power draw estimates of each of the processor cores 205 from the respective power proxy modules 220. In addition, the voltage overshoot mitigation module 242 is configured to collect real-time voltage measurements from the respective CPM sensors 230. The voltage overshoot mitigation module 242 is also configured to process the collected power draw estimate and voltage data for each of the processor cores 205 to determine if an overshoot event is in the incipient stage at the respective processor core 205, including one core 205 or all the cores 205. The voltage overshoot mitigation module 242 is also configured to determine, in real-time, if the indications of the voltage overshoot excursion exceed a predetermined threshold, and if so, a trigger signal 251 is transmitted from the voltage overshoot mitigation module 242 to a voltage overshoot activate module (discussed further with respect to FIG. 3) that employs the voltage overshoot activation circuits 280 to arrest the voltage overshoot excursion through transmission of an activation signal 253 from the voltage overshoot activation circuit 280 to the respective processor core 205.

In some embodiments, the processor cores 205 are also communicatively and operably coupled to the combined voltage overshoot/voltage droop mitigation module 260 that is substantially similar to the combined voltage overshoot/ voltage droop mitigation module 160 (shown in FIG. 1). In some embodiments, the combined voltage overshoot/voltage droop mitigation module 260 is configured to calculate real-time power proxy estimates through determining if a core is executing instructions or not and apply a weighting factor value to the present instructions being executed over a predetermined period of time, for example, and without limitation, 8 cycles. The weighting values are obtained through empirical characterization obtained by running numerous workloads through the respective processor cores, collecting the power consumption data for the particular instructions being executed. Through mathematical formula, the weighting factors are estimated and the calculated estimations are compared with the actual values of the power consumed for the respective workloads. Therefore, accurate estimations of real-time power draw data are generated based on collected real-time processor activity.

For those embodiments with the power proxy modules 220, and where such embodiments employ the indications therefrom, the combined voltage overshoot/voltage droop mitigation module 260 is configured to collect power proxy power draw estimates of each of the processor cores 205 from the respective power proxy modules 220. In addition, the combined voltage overshoot/voltage droop mitigation module 260 is configured to collect real-time voltage measurements from the respective CPM sensors 230. The combined voltage overshoot/voltage droop mitigation module 260 is further configured to process the collected data to determine if either a voltage overshoot event or a voltage droop event is in the incipient stage at the respective processor core 205, including one core 205 or all the cores 205. The combined voltage overshoot/voltage droop mitigation module 260 is further configured to determine, in real-time, if the indications of the voltage overshoot excursion exceed a predetermined voltage overshoot threshold, and if so, a trigger signal 255 is transmitted from the combined voltage overshoot/voltage droop mitigation module 260 to the voltage overshoot activate module (discussed further with respect to FIG. 3) that employs the voltage overshoot activation circuits 280 to arrest the voltage overshoot excursion through transmission of the activation signal 253 from the voltage overshoot activation circuit 280 to the respective processor core 205. In addition, the combined voltage overshoot/voltage droop mitigation module 260 is further configured to determine, in real-time, if the indications of the voltage droop drop are below a predetermined voltage droop threshold, and if so, a trigger signal 257 is transmitted from the combined voltage overshoot/voltage droop mitigation module 260 to the voltage droop throttle module (discussed further with respect to FIG. 3) that employs the voltage droop throttling circuits 282 to arrest the voltage droop through transmission of a throttling signal 259 to the respective processor cores 205.

In at least some embodiments, each processor core 205 is coupled to a respective voltage overshoot mitigation module 242 and a respective combined voltage overshoot/voltage droop mitigation module 260 dedicated to the respective processor core 205. Therefore, in such embodiments, the respective mitigation modules include a voltage overshoot mitigation module 242A and a combined voltage overshoot/voltage droop mitigation module 260A for processor core 205A, etc.

Figure 3:
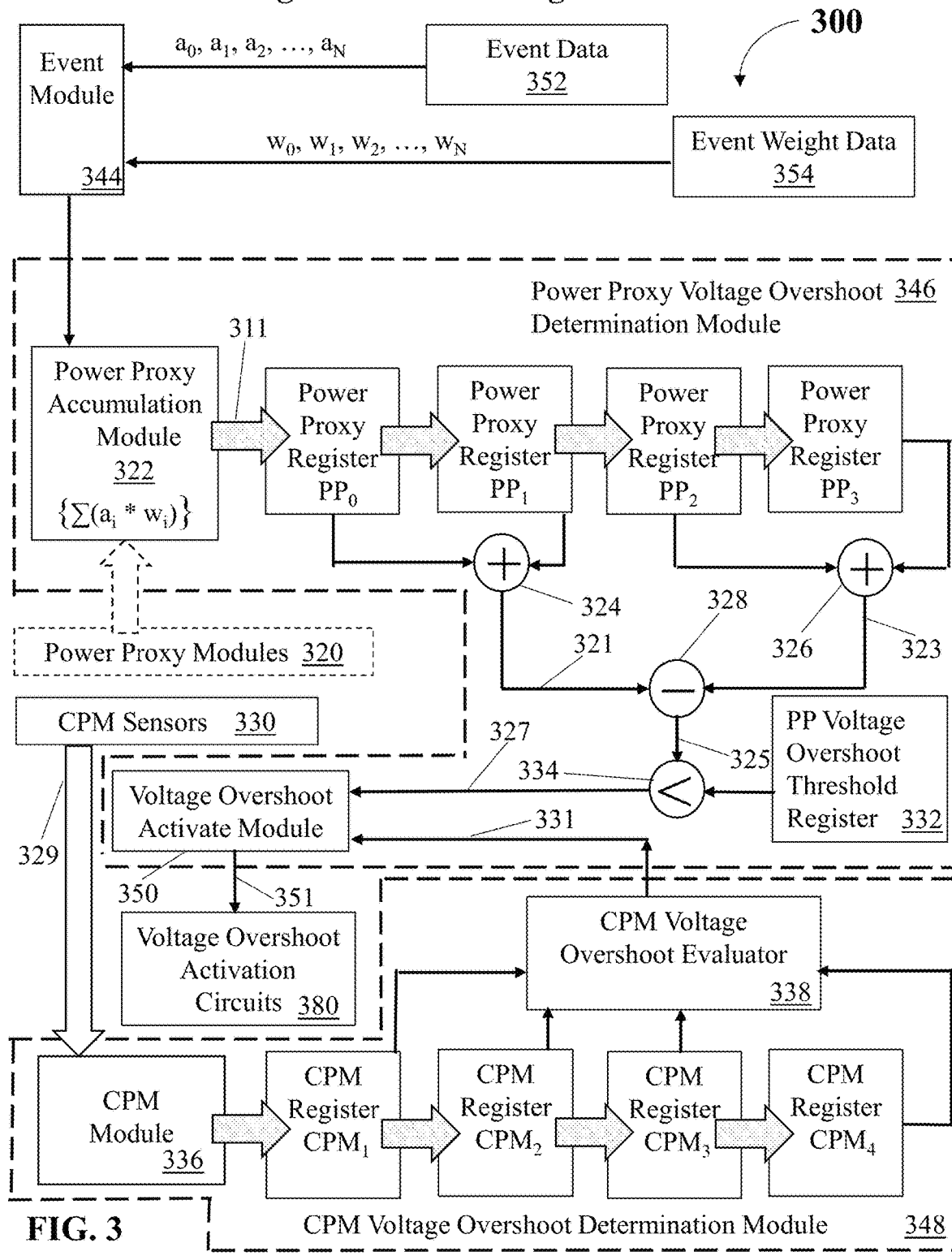
FIG. 3 is a block schematic diagram illustrating a voltage overshoot mitigation module configured for initiating activation action on the cores in a multicore processing device to mitigate voltage overshoot, in accordance with some embodiments of the present disclosure.

Referring to FIG. 3, a block schematic diagram is presented illustrating the voltage overshoot mitigation module 300 that is configured for initiating activation action on one or more processor cores 205 in the multicore processing device 204 (both shown in FIG. 2) to mitigate voltage overshoot, in accordance with some embodiments of the present disclosure. The voltage overshoot mitigation module 300 is substantially similar to the voltage overshoot mitigation module 242 (shown in FIG. 2).

In at least some embodiments, each processor core 205 is coupled to a respective voltage overshoot mitigation module 300 dedicated to the respective processor core 205. Therefore, in such embodiments, the respective voltage overshoot mitigation modules 300 include a voltage overshoot mitigation module 300A for processor core 205A, etc. FIG. 3 illustrates the voltage overshoot mitigation module 300A for processor core 205A; however, for clarity, the "A" designation has not been added to the items in FIG. 3 and the remaining voltage overshoot mitigation modules 300B through 300N for processor cores 205B through 205 N, respectively, are substantially similar to the voltage overshoot mitigation module 300A. In some embodiments, the voltage overshoot management tool 140 includes the resources necessary to manage communications between the multiple voltage overshoot mitigation module 142.

In one or more embodiments, the voltage overshoot mitigation module 300 includes an event module 344 that is configured to receive real-time data on any events that may develop. In some embodiments, the events are associated with any of the processor cores 205, in addition to the respective processor core 205A, to facilitate communication of the status of each of the processor cores 205 with each other. In one or more embodiments, the event module 344 is substantially similar to the event module 144 (shown in FIG. 1). The event module 344 is configured to determine, in real-time, the indications of one or more voltage overshoot and voltage droop events within one or more processing cores 205 of the multicore processing device 204.

In some embodiments, the event module 344 receives event data 352, where the event data 352 includes an indication for each processor core 205 the present status of the respective processor cores 205 with respect to executing instructions. In some embodiments, the indications are binary, i.e., a "1" value represents the respective processor core 205 executing instructions and a "0" value represents the respective processor core 205 not executing any instructions. In some embodiments, greater granularity is used for the event data 352 with respect to the associated processing activity. As used herein, the variable for the event data is "a", such that $a_0, a_1, a_2, \ldots, a_N$ as shown in FIG. 3 represents the string of event data 352 for all of the processor cores 205 transmitted to the event module 344 at a particular point in time. A current string of values for $a_0, a_1, a_2, \ldots, a_N$ is transmitted to the event module 344 at a predetermined periodicity, e.g., without limitation, approximately every 8 cycles.

In some embodiments, the event module 344 receives event weight data 354, where the event weight data 354 includes an indication for each processor core 205 of the present status of the respective processor cores 205 with respect to actual loading. The event weight data 354 is previously generated through empirical characterization of each of the known events obtained by running numerous workloads through the respective processor cores, and collecting the power consumption data for the particular instructions being executed. In general, the weights are fixed for each processor core 205 based on calibration activities performed on the respective processor core 205 prior to exercising the processor core 205 through simulated overshoot mitigation testing. Typically, the weighting factors are integers; however, that is not a requirement. And, if certain triggered events are mutually dependent with each other, weighting factors with negative numbers are not out of the question, albeit, such negative numbers will likely be rare. Accordingly, the weighting factors are most likely positive integers.

In addition, the empirically-derived greater weights by themselves are not fully indicative of the total increased power draw by the respective processing devices 205. For example, and without limitation, the frequency of the respective voltage overshoot events will be directly proportional to the overall power consumption by the affected processor cores 205. And, some voltage overshoot events will more frequent than others. Therefore, in some embodiments, a separate weighting factor may be used or the aforementioned empirically-determined weighting factors may be adjusted to account for the respective empirically-determined frequencies. Accordingly, through established mathematical formula, the respective weighting factors are estimated and the calculated estimations are compared with the actual values of the power consumed for the respective workloads.

Therefore, accurate estimations of real-time power draw data are generated based on collected real-time processor activity. The event weight data 354 includes the respective weighting factors that facilitate distinguishing between those events that pose little risk of a voltage overshoot condition with those events that pose a higher risk of voltage overshoot, i.e., rapid decreases in the volume of instructions being transmitted to the respective processor core 205 for execution, where the magnitude and rate of the decrease are determined to indicate a potential voltage overshoot event. The details of the present processing load on the respective processor cores 205 is collected through direct observation of the respective processor cores 205 by either the event module 344 of any other mechanism that enables operation of the voltage overshoot mitigation module 300 as described herein. As used herein, the variable for the event weight data 354 is "w", such that $w_0, w_1, w_2, \ldots, w_N$ as shown in FIG. 3 represents the individual weighting factors for the present events in each of the processor cores 205 transmitted to the event module 344 at a particular point in time. A current string of values for $w_0, w_1, w_2, \ldots, w_N$ is transmitted to the event module 344 at a predetermined periodicity, e.g., without limitation, approximately every 8 cycles. The event data 352 and the event weight data 354 are transmitted to the event module 344 in synchronization for accurate determinations of the present status of the processor cores 205. Accordingly, in some embodiments, the event module 344 orchestrates collection of the event data 352 and event weight data 354 to determine the present status of the processing load on the respective processor cores 205.

In one or more embodiments, the voltage overshoot mitigation module 300 includes a power proxy (PP) voltage overshoot determination module 346 that is substantially similar to the PP voltage overshoot determination module 146 (shown in FIG. 1). The PP voltage overshoot determination module 346 includes a power proxy (PP) accumulation module 322 that is configured to receive the event data 352 and the event weight data 354 from the event module 344. The PP accumulation module 322 is also configured to accumulate the data over a predetermined time period, e.g., without limitation, 8 cycles and execute an algorithm, such as, $\Sigma(a_i * w_i)$, where the variables "$a_i$" and "$w_i$" are previously discussed. Accordingly, a summation, or accumulation, of the products of the event data 352 and the event weight data 354 is calculated for each processor core 205. Even though, as previously discussed, FIG. 3 represents the configuration of a voltage overshoot mitigation module 300 for a single processor core 205, the present state of the each of the processor cores 205 of the multicore processing device 204 are included in the summation such that such complete status information for the other processor cores 205 are included in the execution of the method steps to be performed on the particular processor core 205 associated with the present voltage overshoot mitigation module 300. Accordingly, the PP accumulation module 322 is configured to generate a first power proxy value 311 that is an estimate of the power draw for the present 8-cycle duration that is indicative of the overall loading of the multicore processing device 204.

In some embodiments, rather than the event data 352 and the event weight data 354, the PP accumulation module 322 is configured to receive state data from each of the power proxy modules 320 (that are substantially similar to the power proxy modules 220 described with respect to FIG. 2) for each of the respective processor cores 205. Such data may be multiplied by a weighting factor and the results are summed to generate the first power proxy value 311. Accordingly, for the remainder of the disclosure, real-time data for the status of the processor cores 205 directly from the power proxy modules 320 may be substituted for the data transmitted from the event module 344.

In some embodiments, the PP voltage overshoot determination module 346 includes four power proxy (PP) registers, where 4 is non-limiting, i.e., a first PP register $PP_0$, a second PP register $PP_1$, a third PP register $PP_2$, and a fourth PP register $PP_3$, that are arranged in a serial manner. The second PP register $PP_1$ is configured to receive the data contents of the first PP register $PP_0$ after a predetermined period of time, e.g., and without limitation, approximately 8 cycles, where the third PP register $PP_2$ is similarly configured to receive the data contents of the second PP register $PP_1$, and the fourth PP register $PP_3$ is configured to receive the data contents of the third PP register $PP_2$. Accordingly, every 8 cycles, the content of the PP register $PP_0$ is updated with newly generated first power proxy value 311 and the other three registers are serially updated with the data from the immediately upstream register. The previous data from the fourth PP register $PP_3$ is either overwritten or transmitted to the data storage system 108 (shown in FIG. 1).

In one or more embodiments, the PP voltage overshoot determination module 346 includes mathematical operators to execute the respective logic through mathematical algorithms. For example, a first addition operator 324 is configured to sum the contents of the first PP register $PP_0$ and the second PP register $PP_1$ to generate a first sum 321 of power proxy values. Also, a second addition operator 326 is configured to sum the contents of the third PP register $PP_2$ and the fourth PP register $PP_3$ to generate a second sum 323 of power proxy values. Further, a subtraction operator 328 is configured to subtract the second sum 323 from the first sum 321 to generate signal representative of a power proxy difference value of the power proxy values, where the magnitude of the power proxy difference value 325 may, or may not, be indicative of a large decrease in processing activity through the estimated large decrease in power draw. The three operators 324, 326, and 328 are configured to determine changes to the processing load on the multicore processing device 204 that should be amplified through summing two adjacent 8-cycle data recordings and determining the difference between the two sums. The PP voltage overshoot determination module 346 is further configured to automatically adapt the operation of the three operators 324, 326, and 328 for those instances where data is not resident within all for PP registers $PP_0$, $PP_1$, $PP_2$, and $PP_3$. For example, and without limitation, if there is not data in the PP register $PP_2$, the PP voltage overshoot determination module 346 will subtract the data in PP register $PP_3$ from the sum 321. In addition, the addition operators 324 And 326 may be configured to merely pass the values in the PP registers $PP_1$ and $PP_3$ for subtraction by the subtraction operator 328 to generate the power proxy difference value 325.

In at least some embodiments, the PP voltage overshoot determination module 346 further includes a PP voltage overshoot threshold register 332 that maintains predetermined threshold values of one or more of the change in magnitude, the duration of the decrease, and the rate of change of processing activity for comparison with the power proxy difference value 325. The PP voltage overshoot determination module 346 also includes a less than operator 334 that executes the comparison operation between the power proxy difference value 325 and the established threshold value resident therein. If the comparison indicates that the power proxy difference value 325 is above or at the threshold, no further action is taken, at least until the next 8 cycles have elapsed. If the comparison indicates that the difference value is less than the threshold value, i.e., the power proxy difference value 325 represents a negative value indicating a decreasing trend of power draw with the associated decrease in processing activity, a PP activate signal 327 is generated that is indicative of the PP voltage overshoot determination module 346 determining that there may be a voltage overshoot event in progress. In some embodiments, the PP voltage overshoot determination module 346 includes a voltage overshoot activate module 350 that is configured to receive the PP activate signal 327 from the less than operator 334.

In one or more embodiments, the voltage overshoot mitigation module 300 includes a CPM voltage overshoot determination module 348 that is substantially similar to the CPM voltage overshoot determination module 148 (shown in FIG. 1). The CPM voltage overshoot determination module 348 is configured to receive real-time voltage measurements 329 from the CPM sensors 330 for the respective processor core 205, where the CPM sensors 330 are substantially similar to the CPM sensors 230 (shown in FIG. 2). In contrast to the more expansive monitoring of all of the processor cores 205 for the PP voltage overshoot determination module 346, the CPM voltage overshoot determination module 348 is associated with only the real-time voltage measurements of the respective processor core 205. The CPM voltage overshoot determination module 348 includes a CPM module 336 configured to receive the real-time voltage measurements 329 from the CPM sensors 330. The voltage measurements of the respective processor cores 205 are indirect indications of power consumption.

In some embodiments, the CPM voltage overshoot determination module 348 includes four CPM registers, where 4 is non-limiting, i.e., a first CPM register $CPM_1$, a second CPM register $CPM_2$, a third CPM register $CPM_3$, and a fourth CPM register $CPM_4$, that are arranged in a serial manner. The second CPM register $CPM_2$ is configured to receive the data contents of the first CPM register $CPM_1$ after a predetermined period of time, e.g., and without limitation, approximately 8 cycles, where the third CPM register $CPM_3$ is similarly configured to receive the data contents of the second CPM register $CPM_2$, and the fourth CPM register $CPM_4$ is configured to receive the data contents of the third CPM register $CPM_3$. Accordingly, every 8 cycles, the content of the CPM register $CPM_1$ is updated with newly generated first voltage measurements 329 and the other three registers are serially updated with the data from the immediately upstream register. The previous data from the fourth CPM register $CPM_4$ is either overwritten or transmitted to the data storage system 108 (shown in FIG. 1).

In at least some embodiments, the CPM voltage overshoot determination module 348 includes a CPM voltage overshoot evaluator 338 that is configured to receive the contents of the CPM registers $CPM_1$, $CPM_2$, $CPM_3$, and $CPM_4$. The CPM voltage overshoot evaluator 338 is further configured to determine if the four voltage measurements separated by 8 cycles each indicate an incipient voltage overshoot. In some embodiments, the CPM voltage overshoot evaluator 338 compares the present set of voltage measurements resident within the CPM registers $CPM_1$, $CPM_2$, $CPM_3$, and $CPM_4$ to a model. In some embodiments, the CPM voltage overshoot evaluator 338 compares the present rate of change of voltage to a threshold value through a slope determination based on the voltage data in the CPM registers $CPM_1$, $CPM_2$, $CPM_3$, and $CPM_4$. For those instances where the CPM voltage overshoot evaluator 338 determines the presence of a voltage overshoot condition, it generates and transmits a CPM activate signal 331 to the voltage overshoot activate module 350. The voltage overshoot activate module 350 is configured to generate and transmit an activation trigger signal 351 (that is substantially similar to the activation trigger signal 251 shown in FIG. 2) upon receipt of both the PP activate signal 327 and the CPM activate signal 331. In some embodiments, the generation of the CPM activate signal 331 is primarily based on the voltage change conditions as determined by the CPM voltage overshoot evaluator 338, where the voltage indications are the anchor to the determination to initiate corrective action. In such embodiments, the PP activate signal 327 as generated is a validating feature that there may be a voltage overshoot event in progress. In some embodiments, the roles are reversed, i.e., the power proxy estimates are the primary determinator and the voltage measurements are the validating feature. The activation trigger signal 351 is received by the voltage overshoot activation circuits 380 (that are substantially similar to the voltage overshoot activation circuits 280 shown in FIG. 2). The voltage overshoot activation circuits 380 are configured to transmit the signals 253 (shown in FIG. 2) to the respective processor core 205 to initiate the artificial power demands that include, and without limitation, one or more of disabling clock gating for the affected processor core 205, initiating dummy fetches into the core-adjacent L3 cache arrays (not shown) from the respective processor core 205, and disabling the clock gating for the adjacent L3 cache array.

Figure 4A:
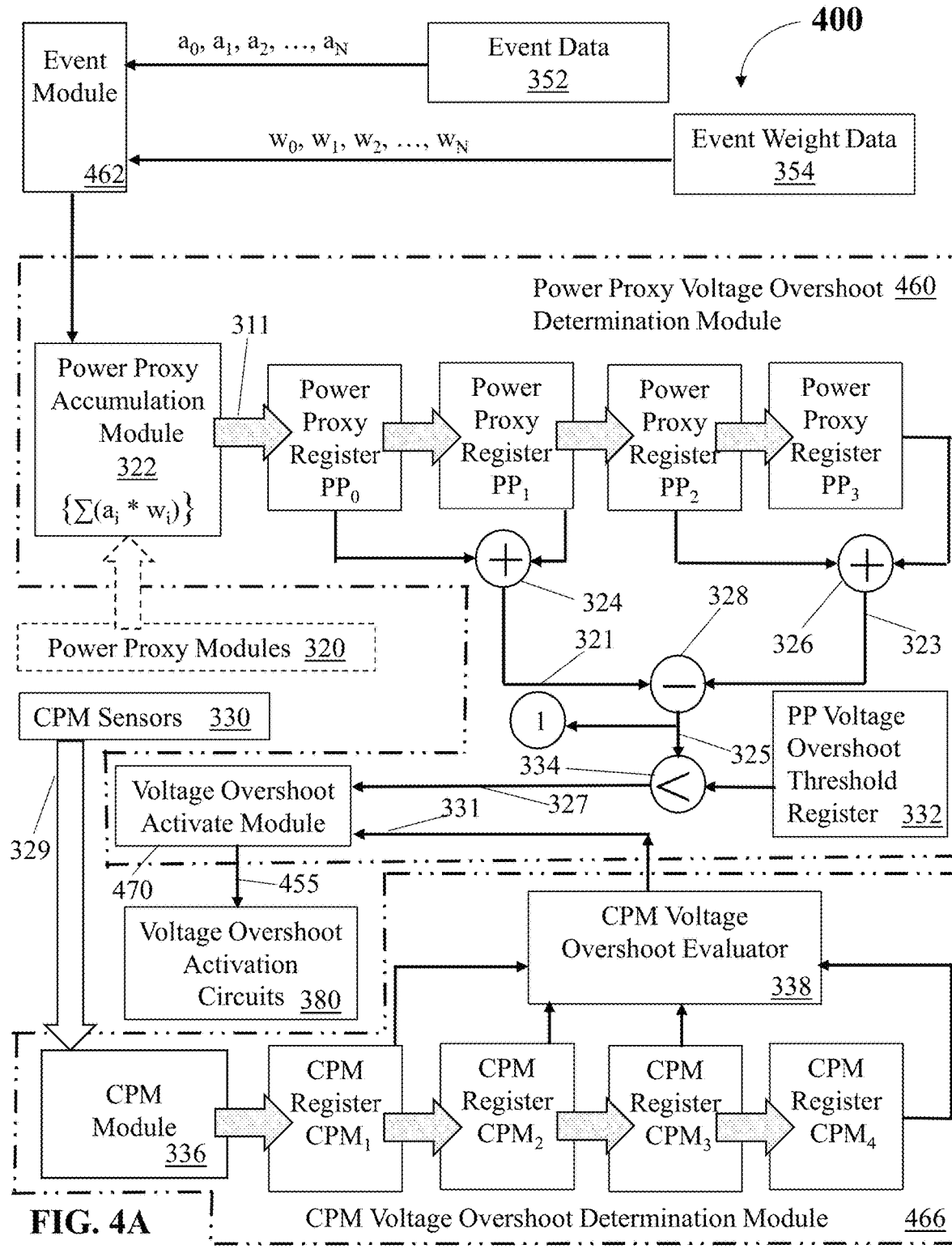
FIG. 4A is a block schematic diagram illustrating a combined voltage overshoot/voltage droop mitigation module configured for initiating one of activation action and throttling action on the cores in a multicore processing device to mitigate voltage overshoot and voltage droop, respectively, in accordance with some embodiments of the present disclosure.

Referring to FIG. 4A, a block schematic diagram is presented illustrating a combined voltage overshoot/voltage droop mitigation module 400 configured for initiating one of activation action and throttling action on the processor cores 205 in the multicore processing device 204 (both shown in FIG. 2) to mitigate voltage overshoot and voltage droop, respectively, in accordance with some embodiments of the present disclosure. FIG. 4A for the combined voltage overshoot/voltage droop mitigation module 400 is substantially similar to the voltage overshoot mitigation module 300 (shown in FIG. 3) in design, configuration, and operation, with any exceptions discussed further with respect to FIG. 4B. Accordingly, the component numbering presented for identical components in FIG. 3 are replicated in FIG. 4A (and FIG. 4B discussed further below) with any exceptions discussed with respect to the respective figures.

The combined voltage overshoot/voltage droop mitigation module 400 includes an event module 462 that is substantially similar to the event module 162 (shown in FIG.

1) and the event module 344 (shown in FIG. 3). The combined voltage overshoot/voltage droop mitigation module 400 also includes a combined PP voltage overshoot/voltage droop determination module 460 that is substantially similar to the combined PP voltage overshoot/voltage droop determination module 260 (shown in FIG. 2) and the PP voltage overshoot determination module 346 (shown in FIG. 3), with any distinctions discussed with reference to FIG. 4B. The combined voltage overshoot/voltage droop mitigation module 400 further includes a CPM voltage overshoot determination module 466 that is substantially similar to the CPM voltage overshoot determination module 166 (shown in FIG. 1) and the CPM voltage overshoot determination module 348 (shown in FIG. 3). The combined voltage overshoot/voltage droop mitigation module 400 also includes a voltage overshoot activate module 470 that is substantially similar to the voltage overshoot activate module 170 (shown in FIG. 1) and the voltage overshoot activate module 350 (shown in FIG. 3). The voltage overshoot activate module 470 is configured to generate and transmit a trigger signal 455 that is substantially similar to the trigger signal 255 (shown in FIG. 2).

Figure 4B:
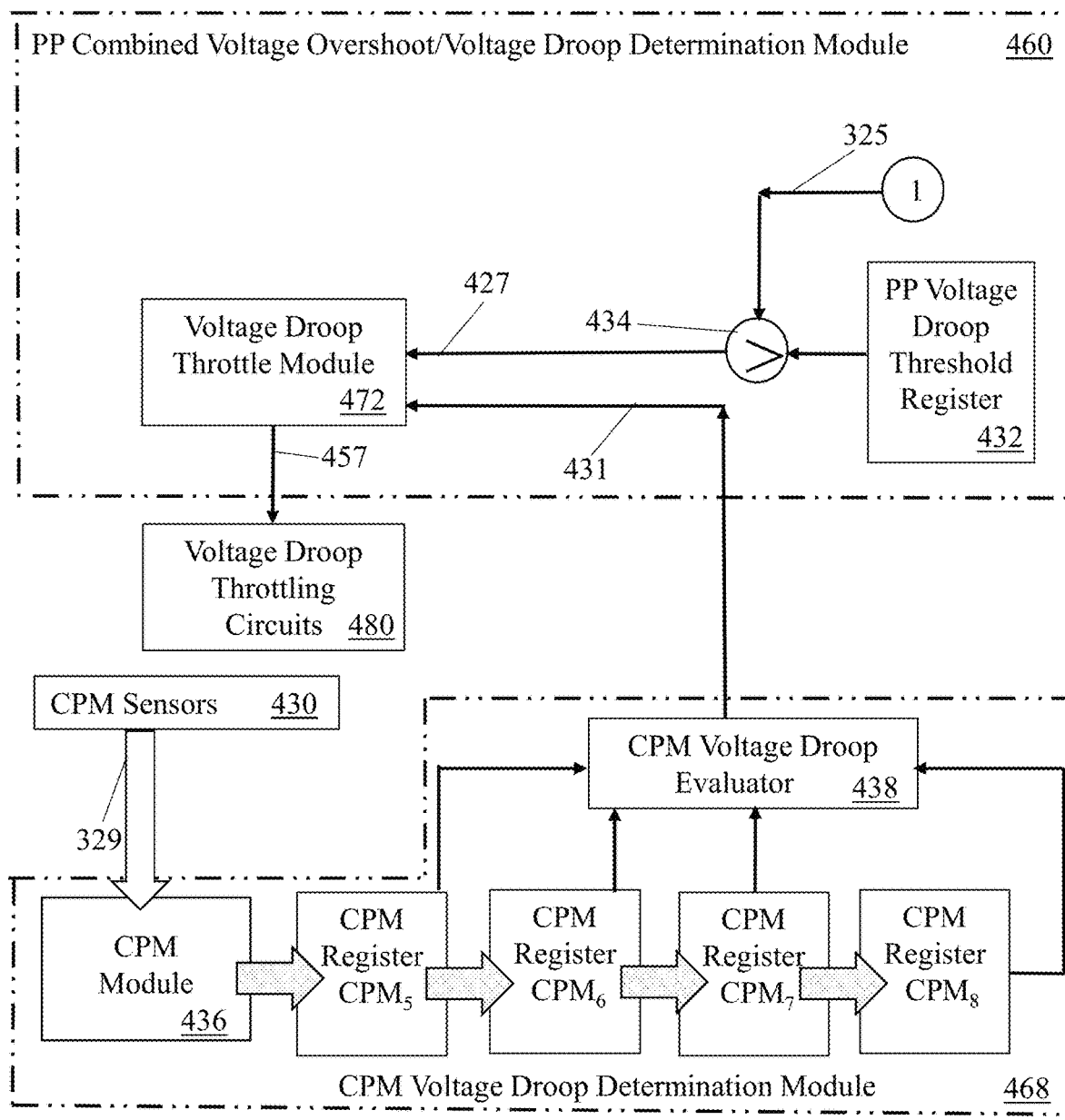
FIG. 4B is a continuation of the block schematic diagram illustrated in FIG. 4A, in accordance with some embodiments of the present disclosure.

Referring to FIG. 4B, a continuation of the block schematic diagram illustrated in FIG. 4A is presented, in accordance with some embodiments of the present disclosure. Specifically, additional components of the combined voltage overshoot/voltage droop mitigation module 400 are presented. At least one distinction between the PP voltage overshoot determination module 346 and the combined PP voltage overshoot/voltage droop determination module 446 is that the module 446 includes a coupling to the conduit for the power proxy difference value 325 to facilitate transmission of the power proxy difference value 325 to a greater than operator 434.

In at least some embodiments, the combined PP voltage overshoot/voltage droop determination module 460 further includes a PP voltage droop threshold register 432 that maintains a predetermined threshold value of the rate of change of processing activity that is indicative of a magnitude and duration of the increase in processing activity for comparison with the power proxy difference value 325.

The combined PP voltage overshoot/voltage droop determination module 446 also includes a greater than operator 434 that executes the comparison operation between the power proxy difference value 325 and the established threshold value resident therein. If the comparison indicates that the power proxy difference value 325 is less than or at the threshold, no further action is taken, at least not until the next 8 cycles have elapsed. If the comparison indicates that the difference value is greater than the threshold value, where a positive value indicates an increasing trend of power draw with the associated increase in processing activity, a PP throttle signal 427 is generated that is indicative of the combined PP voltage overshoot/voltage droop determination module 460 determining that there may be a voltage droop event in progress. In some embodiments, the combined PP voltage overshoot/voltage droop determination module 460 includes a voltage droop throttle module 472 that is configured to receive the PP throttle signal 427 from the less than operator 434, and is substantially similar to the voltage droop throttle module 172 (shown in FIG. 1).

In one or more embodiments, the combined voltage overshoot/voltage droop mitigation module 400 includes a CPM voltage droop determination module 468 that is substantially similar to the CPM voltage droop determination module 168 (shown in FIG. 1). The CPM voltage droop determination module 468 is configured to receive the real-time voltage measurements 329 from CPM sensors 430 for the respective processor core 205, where the CPM sensors 430 are substantially similar to the CPM sensors 330 (shown in FIG. 3). In contrast to the more expansive monitoring of all of the processor cores 205 for the combined PP voltage overshoot/voltage droop determination module 460, the CPM voltage droop determination module 468 is associated with only the real-time voltage measurements of the respective processor core 205. The CPM voltage droop determination module 468 includes a CPM module 436 configured to receive the real-time voltage measurements 329 from the CPM sensors 430.

In some embodiments, the CPM voltage droop determination module 468 includes four CPM registers, where 4 is non-limiting, i.e., a fifth CPM register $CPM_5$, a sixth CPM register $CPM_6$, a seventh CPM register $CPM_7$, and an eighth CPM register $CPM_8$, that are arranged in a serial manner. The sixth CPM register $CPM_6$ is configured to receive the data contents of the fifth CPM register $CPM_5$ after a predetermined period of time, e.g., and without limitation, approximately 8 cycles, where the seventh CPM register $CPM_7$ is similarly configured to receive the data contents of the sixth CPM register $CPM_6$, and the eighth CPM register $CPM_8$ is configured to receive the data contents of the seventh CPM register $CPM_7$. Accordingly, every 8 cycles, the content of the CPM register $CPM_5$ is updated with newly generated first voltage measurements 329 and the other three registers are serially updated with the data from the immediately upstream register. The previous data from the eighth CPM register $CPM_8$ is either overwritten or transmitted to the data storage system 108 (shown in FIG. 1).

In at least some embodiments, the CPM voltage droop determination module 468 includes a CPM voltage droop evaluator 438 that is configured to receive the contents of the CPM registers $CPM_5$, $CPM_6$, $CPM_7$, and $CPM_8$. The CPM voltage droop evaluator 438 is further configured to determine if the four voltage measurements separated by 8 cycles each indicate an incipient voltage droop condition. In some embodiments, the CPM voltage droop evaluator 438 compares the present set of voltage measurements resident within the CPM registers $CPM_5$, $CPM_6$, $CPM_7$, and $CPM_8$ to a model. In some embodiments, the CPM voltage droop evaluator 438 compares the present rate of change of voltage to a threshold value through a slope determination based on the voltage data in the CPM registers $CPM_5$, $CPM_6$, $CPM_7$, and $CPM_8$. For those instances where the CPM voltage droop evaluator 438 determines the presence of a voltage overshoot condition, it generates and transmits a CPM throttle signal 431 to the voltage droop throttle module 472. In some embodiments, the generation of the CPM throttle signal 431 is primarily based on the voltage change conditions as determined by the CPM voltage droop evaluator 438, where the voltage indications are the anchor to the determination to initiate corrective action. In such embodiments, the PP throttle signal 427 as generated is a validating feature that there may be a voltage droop event in progress. In some embodiments, the roles are reversed, i.e., the power proxy estimates are the primary determinator and the voltage measurements are the validating feature. The voltage droop throttle module 472 is configured to generate and transmit a throttling trigger signal 457 (that is substantially similar to the throttling trigger signal 257 shown in FIG. 2) upon receipt of both the PP throttle signal 427 and the CPM throttle signal 457. The throttling trigger signal 457 is received by the voltage droop throttling circuits 480 (that are substantially similar to the voltage droop throttling circuits 282 shown in FIG. 2). The voltage droop throttling circuits 480 are configured to transmit the signals 259 (shown in FIG. 2) to the respective processor core 205 to initiate the throttling actions on the respective processor core 205.

Figure 5A:
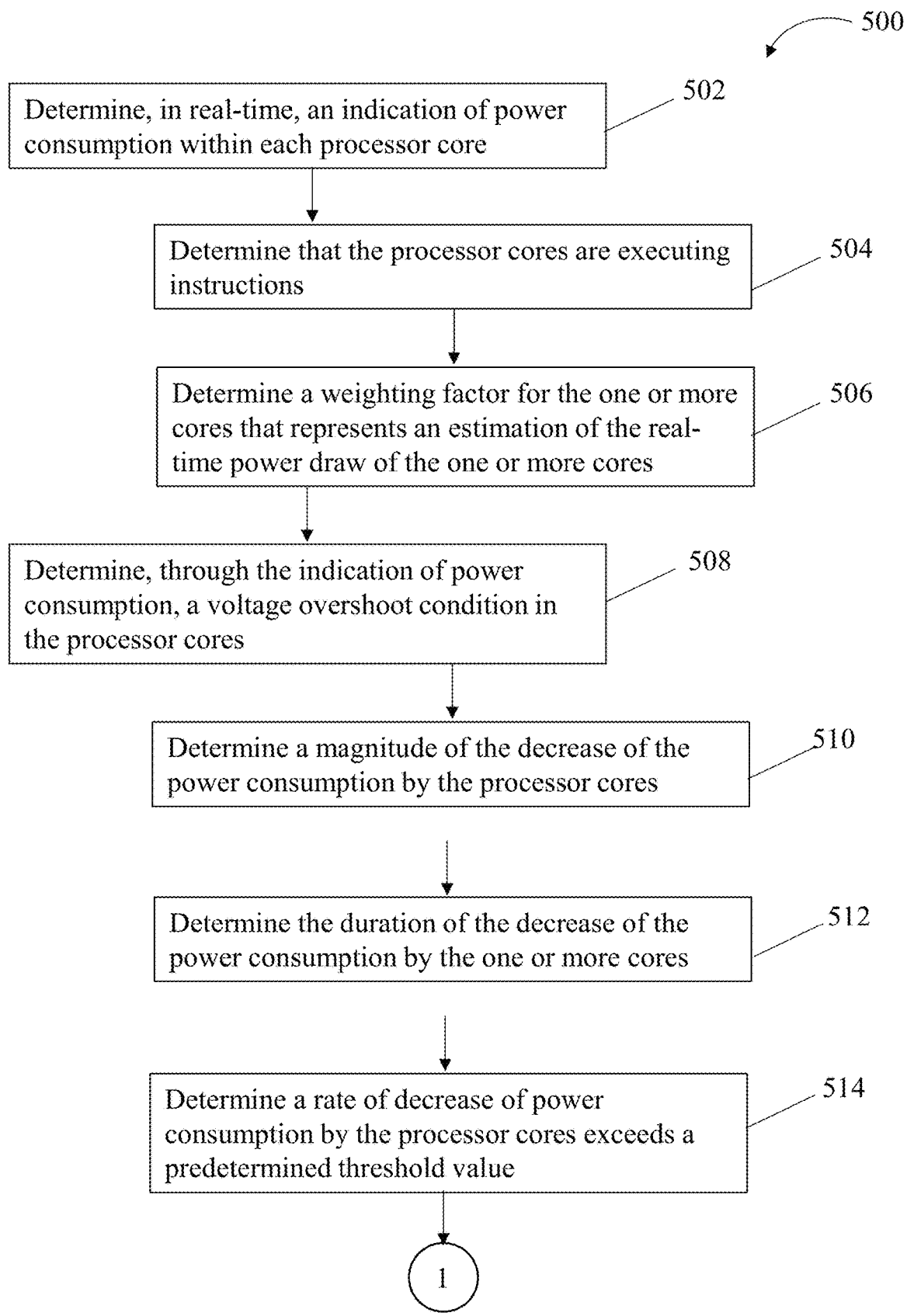
FIG. 5A is a flowchart illustrating a process for increasing power demand to one or more cores in a multicore processing device to mitigate voltage overshoot, in accordance with some embodiments of the present disclosure.

Referring to FIG. 5A, a flowchart is provided illustrating a process 500 for increasing power demand to the one or more processor cores 205 in the multicore processing device 204 (both shown in FIG. 2) to mitigate voltage overshoot, in accordance with embodiments of the present disclosure. Also referring to FIGS. 1-4, the process 500 includes determining 502, in real-time, an indication of power consumption within each processor core 205 of the multicore processing device 204. The method also includes determining 504 that the one or more cores are executing instructions. In some embodiments, the event module 344 receives the event data 352 that is an indication of the present status of the respective processor cores 205 with respect to executing instructions. In some embodiments, the indications are binary, i.e., a "1" value represents the respective processor core 205 executing instructions and a "0" value represents the respective processor core 205 not executing any instructions. The event data 352 is updated at a predetermined periodicity, e.g., without limitation, approximately every 8 cycles. Typically, those processor cores 205 not executing any instructions are in little danger of experiencing a voltage overshoot condition over the next 8 cycles. However, a change of status from processing instructions ("1") to not processing instructions ("0") may be an early indication of a potential voltage overshoot condition for that particular processor core 205.

In addition, in at least some embodiments, the process 500 includes determining 506 a weighting factor for the processor cores 205 that represents an estimation of the real-time power draw of each of the processor cores 205. The event module 344 receives event weight data 354 that represents accurate estimations of real-time power draw data for each of the processor cores. The event weight data 354 is updated at a predetermined periodicity, e.g., without limitation, approximately every 8 cycles, and in synchronization with the event data 352. The event weight data 354 includes the respective weighting factors that facilitate distinguishing between those events that pose little risk of a voltage overshoot condition with those events that do pose a risk of voltage overshoot, i.e., rapid decreases in the volume of instructions being transmitted to the respective processor core 205 for execution, where the magnitude and rate of the decrease are determined to indicate a potential voltage overshoot event.

In some embodiments, the process 500 includes determining 508, through the indication of power consumption, a voltage overshoot condition in the processor cores 205. The PP accumulation module 322 accumulates the event data 352 and the event weight data 354 over a predetermined time period, e.g., without limitation, 8 cycles, and execute an algorithm, such as, $\Sigma(a_i * w_i)$, where the variables "$a_i$" (for the status of each processor core 205) and "$w_i$" (for the weighting factors) are previously discussed. For those processor cores that are not processing any instructions, the product will be zero (0). For those processor cores that are processing instructions, the product will be the weighting factor "$w_i$". The PP accumulation module 322 sums the products to generate the power proxy value 311 that is an estimate of the power draw for the present 8-cycle duration that is indicative of the overall power draw of the multicore processing device 204.

In one or more embodiments, the process includes determining 510 a magnitude of the decrease of the power consumption by the processor cores 205 and determining 512 the duration of the decrease of the power consumption by the processor cores 205. The PP accumulation module 322 generates a power proxy value 311 every 8 cycles and typically the most recent four serialized values of the power proxy value 311 are used for the mathematical operations used to determine the power proxy difference value 325 of the power proxy values. In some embodiments, the two most recent power proxy values 311 are summed and the two least recent power proxy values 311 are summed to generate two relatively large values of 16 cycles of power proxy data each. These sums undergo a subtraction operation to provide the power proxy difference value 325 that includes either a positive value or a negative value to indicate the polarity of the power proxy difference value 325 as well as the magnitude, where a positive value indicates an increasing trend of power draw with the associated increase in processing activity, and a negative value indicates a decreasing trend of power draw with the associated decrease in processing activity. Since the change has been evaluated over a period of at least approximately 24 cycles, the rate of change of the power draw on the multicore processing device 204 is available. A revised value of the power proxy difference value 325 is generated every 8 cycles, thereby further developing the change in magnitude and the rate of change every 8 cycles. Each power proxy difference value 325 is compared to threshold values of the rate of change of power consumption which is indicative of the change in processing activity. Accordingly, the process 500 includes determining 514, subject to the magnitude determination 510 and the duration determination 512, a rate of decrease of power consumption by the processor cores 205 exceeds a predetermined threshold value.

In at least one embodiment, if the comparison indicates that the power proxy difference value 325 is less than the threshold value, where a negative value indicates a decreasing trend of power draw with the associated decrease in processing activity, a PP activate signal 327 is generated and transmitted to the voltage overshoot activate module 350 (or 470) that is indicative of the determination that there may be a voltage overshoot event in progress.

Figure 5B:
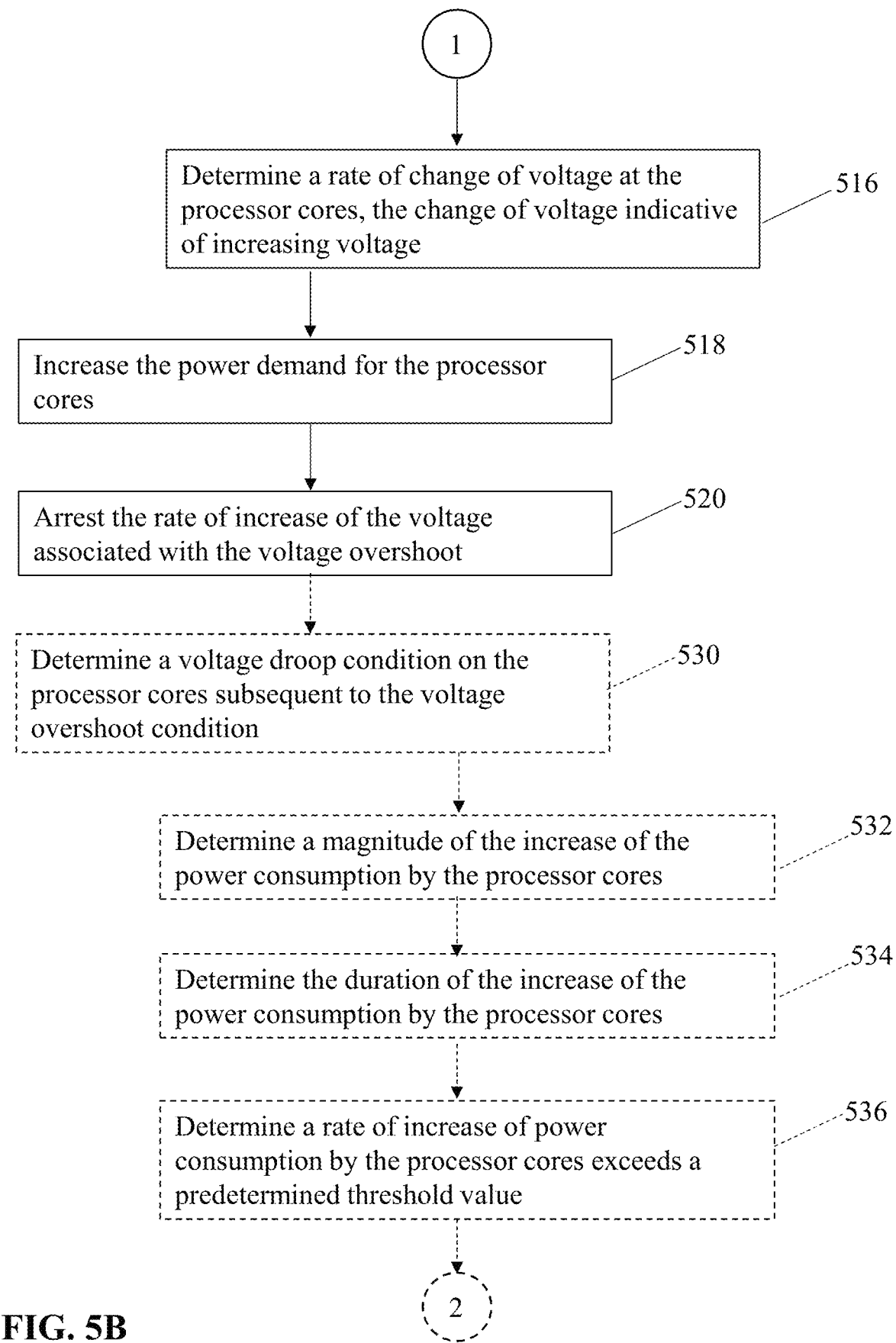
FIG. 5B is a continuation of the flowchart illustrated in FIG. 5A, in accordance with some embodiments of the present disclosure.

Referring to FIG. 5B, a continuation of the flowchart illustrated in FIG. 5A is provided, in accordance with some embodiments of the present disclosure. Continuing to refer to FIGS. 1-5A, the process 500 further includes determining 516 a rate of change of voltage at the processor cores 205, where the change of voltage is indicative of increasing voltage that may be indicative of an voltage overshoot condition in the one or more of the processor cores 205. Voltage measurements of the processor cores 205 are collected at the same periodicity as the power proxy data, i.e., approximately every 8 cycles, where there are four serial voltage measurements being compared with a model to determine if the trend of voltages of the processor cores 205 indicate an incipient voltage overshoot through a determination of the slope of the voltage changes. In some embodiments, the present rate of change of voltage is compared to a threshold value through a slope determination based on the voltage data. For those instances where the presence of a voltage overshoot condition is determined, a CPM activate signal 331 is generated and transmitted to the voltage overshoot activate module 350 (or 470).

Under some circumstances, the PP voltage overshoot determination module 346 generates a determination that a rate of decrease of power consumption by the processor cores 205 is less than a predetermined threshold value and generates and transmits the PP activate signal 327 toward the voltage overshoot activate module 350. However, in some instances, the CPM voltage overshoot determination module 348 may make a determination that a voltage overshoot condition is not imminent based on the calculated rate of change of the voltage by the CPM voltage overshoot evaluator 338. Since the voltage measurements of the respective processor cores 205 are indirect indications of power consumption, the CPM voltage overshoot determination module 348 has a validating role with respect to the power drop determinations from the PP voltage overshoot determination module 346. Accordingly, the CPM voltage overshoot determination module 348 in such cases does not validate the overshoot determination by the PP voltage overshoot determination module 346, and does not generate the CPM activate signal 331 to the voltage overshoot activate module 350, and no corrective action will be taken by the voltage overshoot activation circuits 380.

In one or more embodiments, the process 500 also includes increasing 518 a power demand for the processor cores 205 through using the voltage overshoot activation circuits 380. The voltage overshoot activation circuits 380 increase the power demand by the processor cores 205 through one or more of disabling the clock gating features of the processor cores 205, generating one or more dummy fetches into one or more cache arrays that are core-adjacent, and disabling the clock gating features of the one or more cache arrays. The increase in power demand by the processor cores 205 at least arrests 520 the rate of increase of the voltage associated with the voltage overshoot, and in at least some instances, halts or reverses the increase.

In addition, for those embodiments including the voltage droop components described with respect to FIG. 4B, the process 500 further includes determining 530 a voltage droop condition on one or more of the processor cores 205 cores subsequent to the previously described voltage overshoot conditions. The additional method steps associated with the voltage droop features are shown in phantom in FIGS. 5B and 5C for clarity.

In one or more embodiments, the process includes determining 532 a magnitude of the increase of the power consumption by the processor cores 205 and determining 534 the duration of the increase of the power consumption by the processor cores 205. Similar to the overshoot analyses, the PP accumulation module 322 generates a power proxy value 311 every 8 cycles and typically the most recent four serialized values of the power proxy value 311 are used for the mathematical operations used to determine the power proxy difference value 325 of the power proxy values. In some embodiments, the two most recent power proxy values 311 are summed and the two least recent power proxy values 311 are summed to generate two relatively large values of 16 cycles of power proxy data each. These sums undergo a subtraction operation to provide the power proxy difference value 325 that includes either a positive value or a negative value to indicate the polarity of the power proxy difference value 325 as well as the magnitude, where a positive value indicates an increasing trend of power draw with the associated increase in processing activity, and a negative value indicates a decreasing trend of power draw with the associated decrease in processing activity. Since the change has been evaluated over a period of at least approximately 24 cycles, the rate of change of the power draw on the multicore processing device 204 is available. A revised value of the power proxy difference value 325 is generated every 8 cycles, thereby further developing the change in magnitude and the rate of change every 8 cycles. Each power proxy difference value 325 is compared to threshold values of the rate of change of power consumption which is indicative of the change in processing activity. Accordingly, the process 500 includes determining 536, subject to the magnitude determination 532 and the duration determination 534, a rate of increase of power consumption by the processor cores 205 exceeds a predetermined threshold value.

In at least one embodiment, if the comparison indicates that the power proxy difference value 325 is above the threshold value, where a positive value indicates an increasing trend of power draw with the associated increase in processing activity, a PP activate signal 427 is generated and transmitted to the voltage overshoot activate module 470 that is indicative of the determination that there may be a voltage droop event in progress.

Figure 5C:
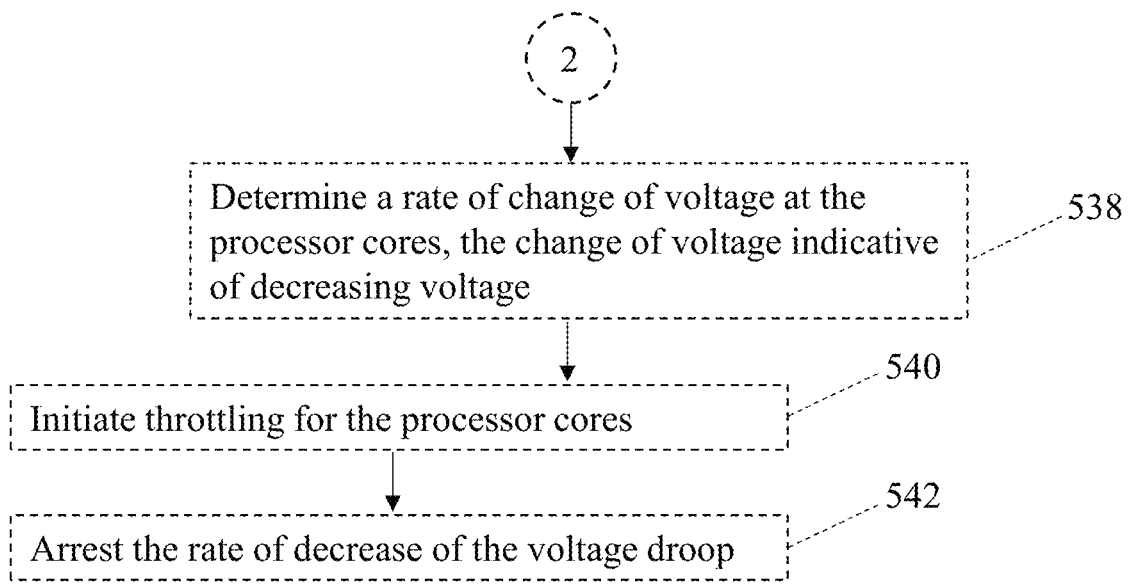
FIG. 5C is a continuation of the flowchart illustrated in FIG. 5B, in accordance with some embodiments of the present disclosure.

Referring to FIG. 5C, a continuation of the flowchart illustrated in FIG. 5B is provided, in accordance with some embodiments of the present disclosure. Continuing to refer to FIGS. 1-5B, the process 500 further includes determining 538 a rate of change of voltage at the processor cores 205, where the change of voltage is indicative of decreasing voltage that may be indicative of a voltage droop condition in the one or more of the processor cores 205. Voltage measurements of the processor cores 205 are collected at the same periodicity as the power proxy data, i.e., approximately every 8 cycles, where there are four serial voltage measurements being compared with a model to determine if the trend of voltages of the processor cores 205 indicate an incipient voltage droop through a determination of the slope of the voltage changes. In some embodiments, the present rate of change of voltage is compared to a threshold value through a slope determination based on the voltage data. For those instances where the presence of a voltage droop condition is determined, a CPM activate signal 431 is generated and transmitted to the voltage overshoot activate module 470.

Under some circumstances, the combined PP voltage overshoot/voltage droop determination module 460 generates a determination that a rate of increase of power consumption by the processor cores 205 exceeds a predetermined threshold value generates and transmits the PP activate signal 427 toward the voltage droop throttle module 472. However, in some instances, the CPM voltage droop determination module 468 may make a determination that a voltage droop condition is not imminent based on the calculated rate of change of the voltage by the CPM voltage droop evaluator 438. Since the voltage measurements of the respective processor cores 205 are indirect indications of power consumption, the CPM voltage droop determination module 468 has a validating role with respect to the power increase determinations from the combined PP voltage overshoot/voltage droop determination module 460. Accordingly, the CPM voltage droop determination module 468 in such cases does not validate the voltage droop determination by combined PP voltage overshoot/voltage droop determination module 460, and does not the generate the CPM throttle signal 431 to the voltage droop throttle module 472, and no corrective action will be taken by the voltage droop throttling circuits 480.

In one or more embodiments, the process 500 also includes initiating 540 throttling on the processor cores 205 through using the voltage droop throttling circuits 480. The voltage droop throttling circuits 480 initiate and increase the throttling on the processor cores 205 through predetermined throttling actions. The increased throttling action on the processor cores 205 at least arrests 542 the rate of decrease of the voltage associated with the voltage droop, and in at least some instances, halts or reverses the voltage droop conditions.

A system, computer program product, and method are disclosed and described herein for initiating remedial actions for a sensed voltage overshoot to arrest the overshoot, thereby mitigating the magnitude of a subsequent voltage droop event, through increasing power demand to one or more of the processor cores in the multicore processing device to mitigate the initial voltage overshoot conditions. More specifically, the predictive voltage droop management system, computer program product, and method as disclosed and described herein are configured to provide a mechanism for arresting a voltage overshoot that includes artificially increasing the power demand at the affected cores, and all cores if necessary, with the increased demand flattening the voltage surge to reduce the magnitude of the surge and its duration. The mechanism to artificially increase the power demand for the cores is configured to not further exacerbate the subsequent voltage droop when the processing demand for the cores rebounds rapidly.

Real-time power proxy estimates are generated through determining if a core is executing instructions or not and applying a weighting factor value to the present instructions being executed over a predetermined period of time, for example, and without limitation, 8 cycles. The weighting values are obtained through empirical characterization obtained by running numerous workloads through the respective processor cores, and collecting the power consumption data for the particular instructions being executed. Through mathematical formula, the weighting factors are estimated and the calculated estimations are compared with the actual values of the power consumed for the respective workloads. Therefore, accurate estimations of real-time power draw data are generated based on collected real-time processor activity.

In at least some of the embodiments described herein, real-time voltage change measurements through critical-path monitor (CPM) sensors are combined to detect voltage overshoot conditions at each core. Many of the known multicore processors include one or more CPM sensors placed at various locations in each processor core to act as monitors of real-time voltage overshoot and real-time voltage droop for the respective processor core.

Moreover, the CPM sensors present in the processing core may also provide chip-wide voltage measurements, since all of the processing cores are on a common clock-grid. Therefore, the embodiments disclosed herein include using a voltage slope as derived from the CPM voltage measurements as an anchor (to know the state of the chip) locally at the respective cores and use the power proxy measurements (also for the respective cores) to detect a change in the affected core's processing activity to detect the voltage overshoot at the incipient stage. Once the voltage overshoot is detected, the power demand from the affected cores, or all the cores, is artificially increased through one or more methods, including, without limitation, disabling clock gating for the affected cores, executing dummy fetches into the core-adjacent L3 cache arrays from the respective core, and disabling clock gating for the adjacent L3 cache array to artificially increase the power demand for the respective processor core. The early arresting of the voltage overshoot facilitates decreasing the magnitude of the subsequent voltage droop since the increased artificial power draws may be quickly terminated to not provide significant power demand as the rapid rise in processing activity increases.

Moreover, the system, computer program product, and method disclosed and described herein are configured to identify and arrest voltage droop conditions that may develop if the rapid drop in processing activity is quickly reversed within a particular time frame such that a rapid increase in processing activity initiates a droop in the processor voltage. Predetermined throttling actions are employed to arrest the resultant voltage droop conditions.

Therefore, the embodiments disclosed herein provide an improvement to computer technology. For example, the embodiments disclosed herein employ robust mechanisms to determine potential voltage overshoot conditions due to a rapid decrease in processing activity in a processor core such that the voltage overshot conditions may be arrested as soon as possible through employment of artificially increasing the power demand of the affected processor cores. In addition, in the event that the rapid decrease in processing activity is immediately followed by a rapid increase in processing activity, a significant voltage droop event may develop. The robust embodiments described herein are configured to identify such conditions as soon as practicable and leverage predetermined throttling mechanism to arrest the voltage droop. Moreover, the voltage overshoot activation mechanisms employed to arrest the voltage overshoot are configured to not exacerbate the subsequent voltage droop conditions.

Figure 6:
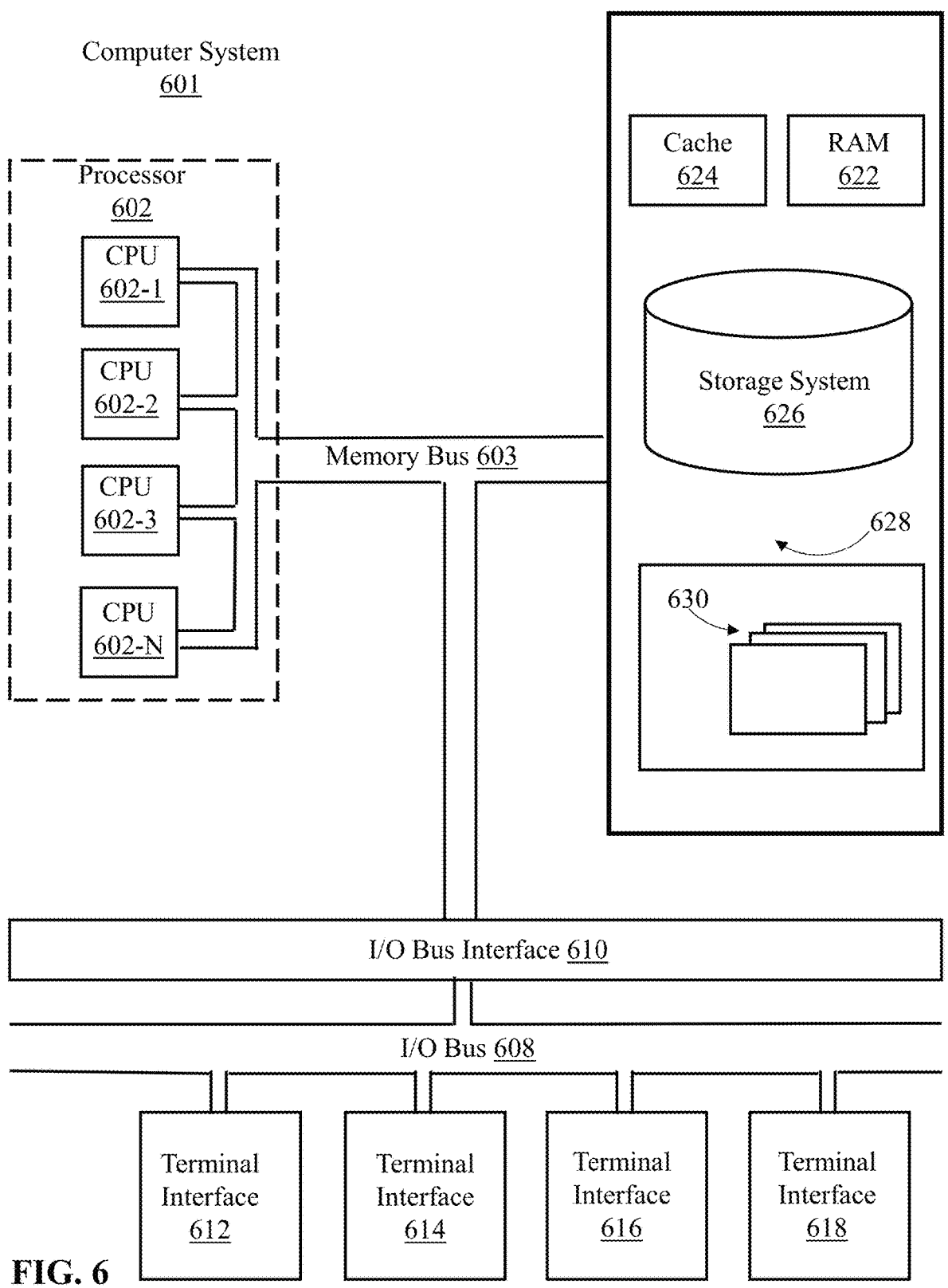
FIG. 6 is a block schematic diagram illustrating a computing system, in accordance with some embodiments of the present disclosure.

Referring now to FIG. 6, a block schematic diagram is provided illustrating a computing system 601 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 601 may comprise one or more CPUs 602, a memory subsystem 604, a terminal interface 612, a storage interface 616, an I/O (Input/Output) device interface 614, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602-1, 602-2, 602-3, 602-N, herein collectively referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may include one or more levels of on-board cache.

System memory 604 may include computer system readable media in the form of volatile memory, such as random access memory (RAM) 622 or cache memory 624. Computer system 601 may further include other removable/non-removable, volatile/non-volatile computer system storage media. By way of example only, storage system 626 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

Although the memory bus 603 is shown in FIG. 6 as a single bus structure providing a direct communication path among the CPUs 602, the memory subsystem 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

One or more programs/utilities 628, each having at least one set of program modules 630 may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 628 and/or program modules 630 generally perform the functions or methodologies of various embodiments.

It is to be understood that although this disclosure includes a detailed description on cloud computing, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows.

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

A cloud computing environment is service oriented with a focus on statelessness, low coupling, modularity, and semantic interoperability. At the heart of cloud computing is an infrastructure that includes a network of interconnected nodes. The system 601 may be employed in a cloud computing environment.

Figure 7:
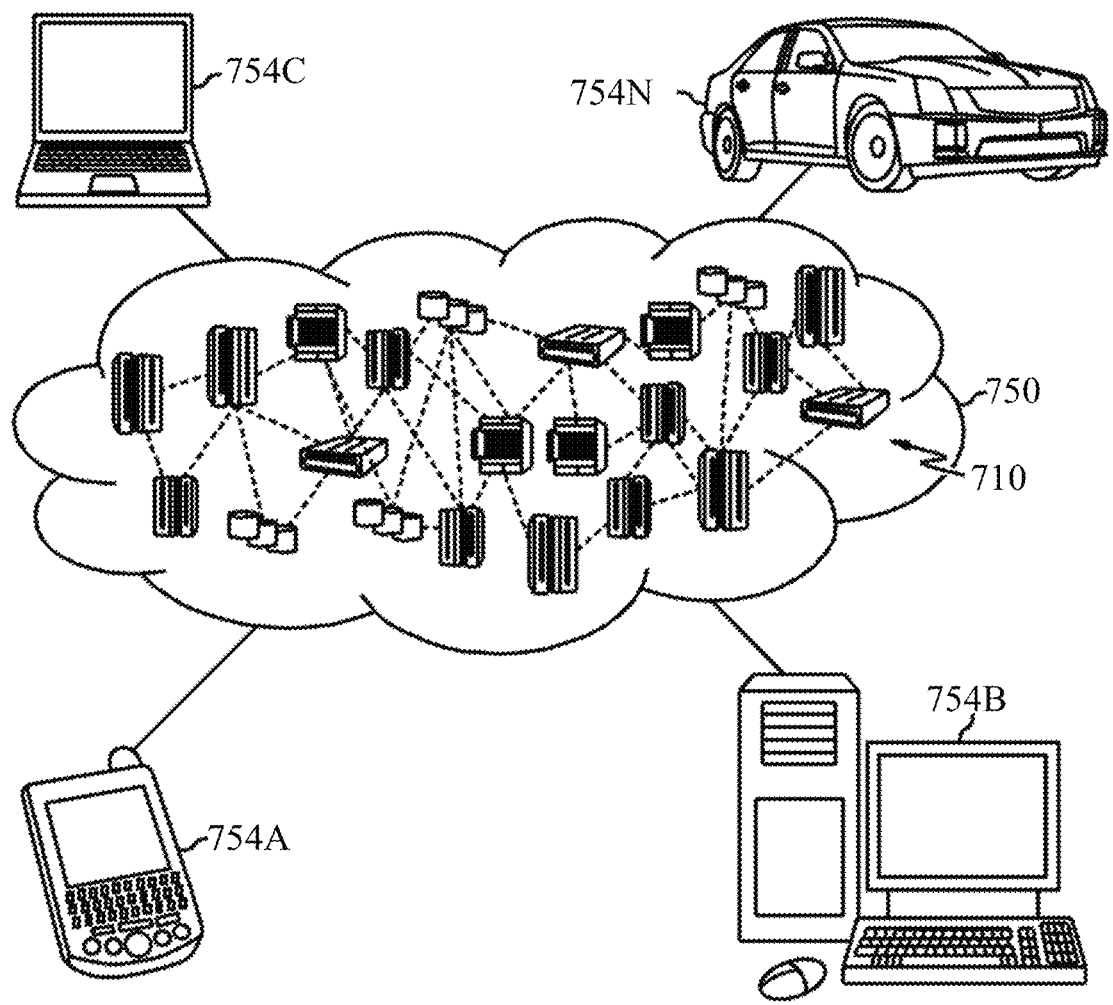
FIG. 7 is a schematic diagram illustrating a cloud computing environment, in accordance with some embodiments of the present disclosure.

Referring to FIG. 7, a schematic diagram is provided illustrating a cloud computing environment 750, in accordance with some embodiments of the present disclosure. As shown, cloud computing environment 750 comprises one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 may communicate with any type of computerized device over any type of network and/or network addressable connection (e.g., using a web browser).

Figure 8:
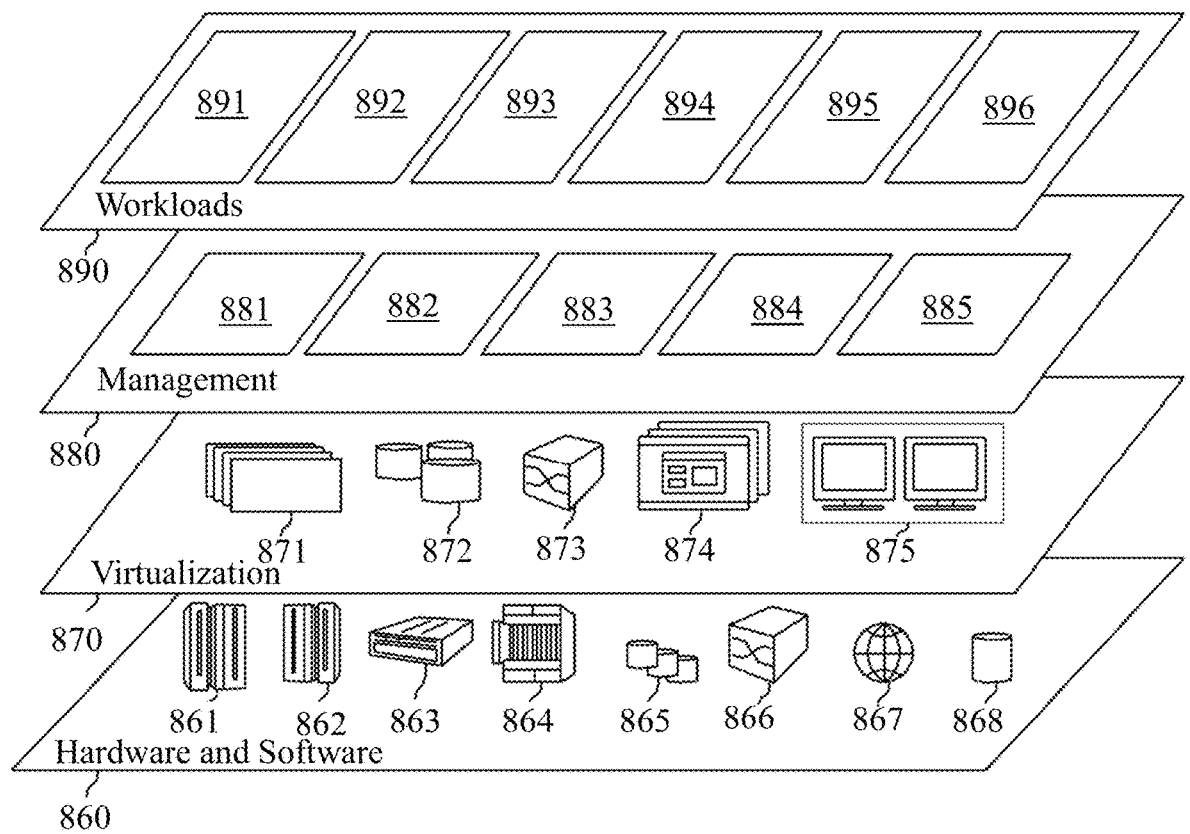
FIG. 8 is a schematic diagram illustrating a set of functional abstraction model layers provided by the cloud computing environment, in accordance with some embodiments of the present disclosure.

Referring to FIG. 8, a schematic diagram is provided illustrating a set of functional abstraction model layers provided by the cloud computing environment 750 (FIG. 7), in accordance with some embodiments of the present disclosure. It should be understood in advance that the components, layers, and functions shown in FIG. 8 are intended to be illustrative only and embodiments of the disclosure are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; layout detection 893; data analytics processing 894; transaction processing 895; and increasing power demand to one or more cores in a multicore processing device to mitigate voltage overshoot 896.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for mitigating voltage overshoot in one or more cores in a multicore processing device including a plurality of cores comprising:
   one or more memory devices communicatively and operably coupled to the multicore processing device; and
   a voltage overshoot management system at least partially embedded within the one or more memory devices, a voltage overshoot management system comprising one or more voltage overshoot activation circuits, wherein the voltage overshoot management system is configured to at least arrest the rate of increase of a voltage overshoot comprising:
      determine, in real-time, an indication of power consumption within each core of the one or more cores;

determine, through the indication of power consumption, a voltage overshoot condition in the one or more cores;
increase, subject to the voltage overshoot determination, for the one or more cores, through the one or more voltage overshoot activation circuits, a power demand thereof, comprising an increase of a processing activity of the one or more cores; and
increase, subject to the increasing the power demand, through the one or more voltage overshoot activation circuits, power delivery to the one or more cores, thereby reducing a magnitude and duration of the voltage overshoot.

2. The system of claim 1, wherein the voltage overshoot management system is further configured to:
determine that the one or more cores are executing instructions; and
determine a weighting factor for the one or more cores that represents an estimation of a real-time power draw of the one or more cores.

3. The system of claim 1, wherein the voltage overshoot management system is further configured to determine one or more of:
a rate of change of voltage at the one or more cores;
the rate of change of voltage is indicative of increasing voltage;
the rate of change of voltage exceeds a threshold value indicative of a voltage overshoot condition, thereby validating the voltage overshoot condition based on the power consumption determination; and
the rate of change of voltage does not exceed the threshold value, thereby not validating a voltage overshoot condition based on the power consumption determination, and preventing initiation of corrective action.

4. The system of claim 1, wherein the system further comprises one or more cache arrays, the voltage overshoot management system is further configured to:
disable clock gating features of the one or more cores;
generate one or more dummy fetches into the one or more cache arrays that are core-adjacent; and
disable clock gating features of the one or more cache arrays that are core-adjacent.

5. The system of claim 1, wherein the voltage overshoot management system is further configured to:
determine a magnitude of a decrease of the power consumption by the one or more cores;
determine a duration of the decrease of the power consumption by the one or more cores; and
determine, subject to the magnitude determination and the duration determination, a rate of the decrease of the power consumption by the one or more cores exceeds a predetermined threshold value.

6. The system of claim 1, wherein the voltage overshoot management system further comprises a voltage droop determination module configured to:
determine a voltage droop condition on the one or more cores subsequent to the voltage overshoot condition on the one or more cores through one or more of:
the indication of power consumption; and
determination of a rate of change of voltage at the one or more cores, the change of voltage indicative of decreasing voltage.

7. The system of claim 6, wherein the voltage overshoot management system is further configured to:
determine a magnitude of an increase of the power consumption by the one or more cores;
determine a duration of the increase of the power consumption by the one or more cores; and
determine, subject to the magnitude determination and the duration determination, a rate of increase of power consumption by the one or more cores exceeds a predetermined threshold value.

8. A computer program product embodied on at least one computer readable storage medium having computer executable instructions for mitigating voltage overshoot in one or more cores in a multicore processing device that when executed cause one or more computing devices to:
at least arrest a rate of increase of a voltage overshoot comprising:
determine, in real-time, an indication of power consumption within each core of the one or more cores;
determine, through the indication of power consumption, a voltage overshoot condition in the one or more cores;
increase, subject to the voltage overshoot determination, for the one or more cores, through the one or more voltage overshoot activation circuits, a power demand thereof, comprising an increase of a processing activity of the one or more cores; and
increase, subject to the increasing the power demand, through the one or more voltage overshoot activation circuits, power delivery to the one or more cores, thereby reducing a magnitude and duration of the voltage overshoot.

9. The computer program product of claim 8, further having computer executable instructions to:
determine that the one or more cores are executing instructions; and
determine a weighting factor for the one or more cores that represents an estimation of a real-time power draw of the one or more cores.

10. The computer program product of claim 8, further having computer executable instructions to determine one or more of:
a rate of change of voltage at the one or more cores
the rate of change of voltage is indicative of increasing voltage;
the rate of change of voltage exceeds a threshold value indicative of a voltage overshoot condition, thereby validating the voltage overshoot condition based on the power consumption determination; and
the rate of change of voltage does not exceed the threshold value, thereby not validating a voltage overshoot condition based on the power consumption determination, and preventing initiation of corrective action.

11. The computer program product of claim 8, further having computer executable instructions to:
disable clock gating features of the one or more cores;
generate one or more dummy fetches into one or more cache arrays that are core-adjacent; and
disable clock gating features of the one or more cache arrays.

12. The computer program product of claim 8, further having computer executable instructions to:
determine a magnitude of a decrease of the power consumption by the one or more cores;
determine a duration of the decrease of the power consumption by the one or more cores; and
determine, subject to the magnitude determination and the duration determination, a rate of a decrease of the power consumption by the one or more cores exceeds a predetermined threshold value.

13. The computer program product of claim 8, further having computer executable instructions to:
- determine a voltage droop condition on the one or more cores subsequent to the voltage overshoot condition on the one or more cores through one or more of:
  - the indication of power consumption; and
  - determination of a rate of change of voltage at the one or more cores, the change of voltage indicative of decreasing voltage, wherein the determine the voltage droop condition comprises:
    - determine a magnitude of an increase of the power consumption by the one or more cores;
    - determine a duration of the increase of the power consumption by the one or more cores; and
    - determine, subject to the magnitude determination and the duration determination, a rate of increase of power consumption by the one or more cores exceeds a predetermined threshold value.

14. A computer-implemented method for mitigating voltage overshoot in one or more cores in a multicore processing device including a plurality of cores comprising:
- at least arresting a rate of increase of a voltage overshoot comprising:
  - determining, in real-time, an indication of power consumption within each core of the one or more cores;
  - determining, through the indication of power consumption, a voltage overshoot condition in the one or more core;
  - increasing, for the one or more cores, a power demand thereof, comprising increasing a processing activity of the one or more cores; and
  - increasing, subject to the increasing the power demand, power delivery to the one or more cores, thereby reducing a magnitude and duration of the voltage overshoot.

15. The method of claim 14, wherein the determining an indication of power consumption comprises:
- determining that the one or more cores are executing instructions; and
- determining a weighting factor for the one or more cores that represents an estimation of a real-time power draw of the one or more cores.

16. The method of claim 14, where the determining the voltage overshoot condition in the one or more cores comprises one or more of:
- determining a rate of change of voltage at the one or more cores
- determining the rate of change of voltage is indicative of increasing voltage;
- determining the rate of change of voltage exceeds a threshold value indicative of a voltage overshoot condition, thereby validating the voltage overshoot condition based on the power consumption determination; and
- determining the rate of change of voltage does not exceed the threshold value, thereby not validating a voltage overshoot condition based on the power consumption determination, and preventing initiation of corrective action.

17. The method of claim 14, wherein the increasing a power demand of the one or more cores comprises one or more of:
- disabling clock gating features of the one or more cores;
- generating one or more dummy fetches into one or more cache arrays that are core-adjacent; and
- disabling clock gating features of the one or more cache arrays.

18. The method of claim 14, wherein the determining the voltage overshoot condition in the one or more cores through the indication of power consumption comprises:
- determining a magnitude of a decrease of the power consumption by the one or more cores;
- determining a duration of the decrease of the power consumption by the one or more cores; and
- determining, subject to the magnitude determination and the duration determination, a rate of a decrease of the power consumption by the one or more cores exceeds a predetermined threshold value.

19. The method of claim 14, further comprising:
- determining a voltage droop condition on the one or more cores subsequent to the voltage overshoot condition on the one or more cores through one or more of:
  - the indication of power consumption; and
  - determining a rate of change of voltage at the one or more cores, the change of voltage indicative of decreasing voltage.

20. The method of claim 19, wherein the determining the voltage droop condition in the one or more cores through the indication of power consumption comprises:
- determining a magnitude of an increase of the power consumption by the one or more cores;
- determining a duration of the increase of the power consumption by the one or more cores; and
- determining, subject to the magnitude determination and the duration determination, a rate of increase of power consumption by the one or more cores exceeds a predetermined threshold value.

* * * * *